(12) United States Patent
Kvalheim

(10) Patent No.: US 8,322,951 B2
(45) Date of Patent: Dec. 4, 2012

(54) APPARATUS FOR EXTRACTING AND DELIVERING ARTICLES IN AMOUNTS OF UNIFORM SIZE

(76) Inventor: Andrew M. Kvalheim, Petaluma, CA (US)

( * ) Notice: Subject to any disclaimer, the term of this patent is extended or adjusted under 35 U.S.C. 154(b) by 0 days.

(21) Appl. No.: 13/385,323

(22) Filed: Feb. 14, 2012

(65) Prior Publication Data

US 2012/0177451 A1 Jul. 12, 2012

(51) Int. Cl.
*B65G 53/40* (2006.01)

(52) U.S. Cl. ............ 406/109; 406/50; 406/83; 406/114; 406/127; 406/151; 406/168

(58) Field of Classification Search ............... 406/50, 406/83, 109, 114, 127, 151, 168, 113, 115, 406/116
See application file for complete search history.

(56) References Cited

U.S. PATENT DOCUMENTS

| | | | | |
|---|---|---|---|---|
| 1,605,196 A * | 11/1926 | Ligon | ............................ | 406/105 |
| 2,856,099 A * | 10/1958 | Batchelder | ..................... | 221/211 |
| 3,152,720 A * | 10/1964 | Corwin et al. | ..................... | 221/1 |
| 3,533,535 A * | 10/1970 | Knapp | ........................... | 221/211 |
| 3,820,666 A * | 6/1974 | Nye | ............................... | 414/736 |
| 4,677,917 A * | 7/1987 | Dugge et al. | ................... | 105/248 |
| 4,685,494 A * | 8/1987 | Lofgren et al. | ................... | 141/65 |
| 4,812,086 A * | 3/1989 | Kopernicky | ................... | 406/153 |
| 4,848,592 A * | 7/1989 | Shemeta | ....................... | 221/211 |
| 4,901,431 A * | 2/1990 | Gast | ................................ | 29/707 |
| 5,005,612 A * | 4/1991 | Kurtz | ............................... | 141/7 |
| 5,090,590 A * | 2/1992 | Hoffman | ........................ | 221/15 |
| 5,117,533 A * | 6/1992 | Stuller | .......................... | 19/64.5 |
| 5,199,472 A * | 4/1993 | Rollison | ........................ | 141/65 |
| 5,265,653 A * | 11/1993 | Herlth | ............................. | 141/65 |
| 5,588,554 A * | 12/1996 | Jones | ............................. | 221/88 |
| 6,036,408 A * | 3/2000 | Wilhelm et al. | ............. | 406/113 |
| 6,089,795 A * | 7/2000 | Booth | ............................. | 406/43 |
| 6,158,926 A * | 12/2000 | Precetti | ........................... | 406/39 |
| 6,352,393 B1 * | 3/2002 | Sanders | ......................... | 406/152 |
| 6,588,053 B1 * | 7/2003 | Nowak | .......................... | 15/340.1 |
| 6,609,870 B2 * | 8/2003 | Williams et al. | ............. | 414/291 |
| 6,688,489 B2 * | 2/2004 | Bloch et al. | ..................... | 221/88 |
| 6,772,508 B2 * | 8/2004 | Bloch et al. | ..................... | 29/709 |
| 6,827,529 B1 * | 12/2004 | Berge et al. | ..................... | 406/28 |
| 6,979,166 B2 * | 12/2005 | Ours et al. | ..................... | 414/403 |
| 8,147,169 B1 * | 4/2012 | Kvalheim | ..................... | 406/109 |

\* cited by examiner

*Primary Examiner* — Joseph A Dillon, Jr.
(74) *Attorney, Agent, or Firm* — Corwin R. Horton

(57) ABSTRACT

Apparatus comprising an implement for extracting charges of uniform size of articles from a mass of the articles and delivering the charges to a receiver. The implement has a chamber for receiving the articles to form the charge. The chamber has a mouth through which articles are drawn into the chamber by applying a vacuum to the chamber. The implement then delivers and deposits the charge by releasing the vacuum. The chamber has a vent with an air permeable article barrier for access to a vacuum generator.

22 Claims, 23 Drawing Sheets

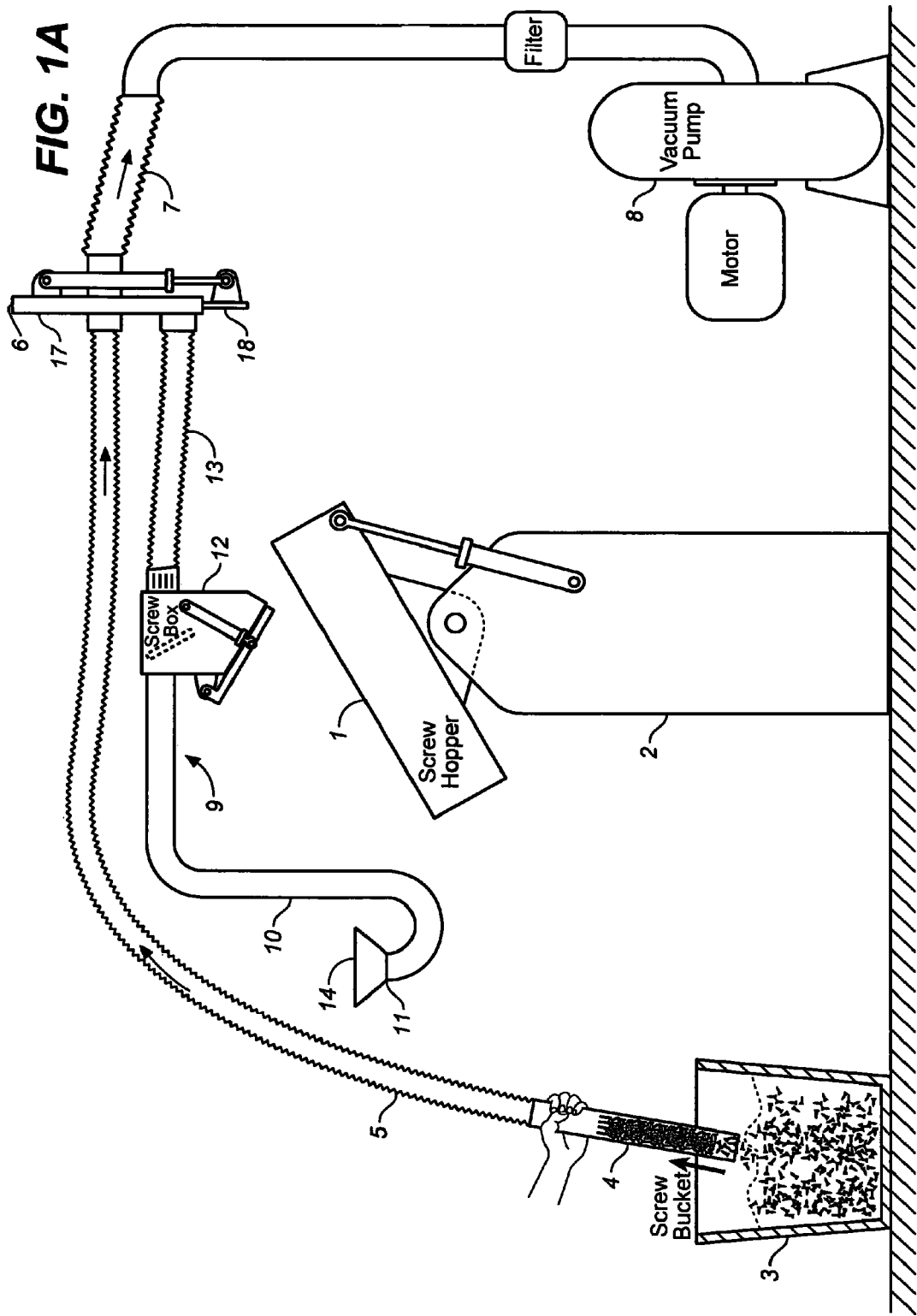

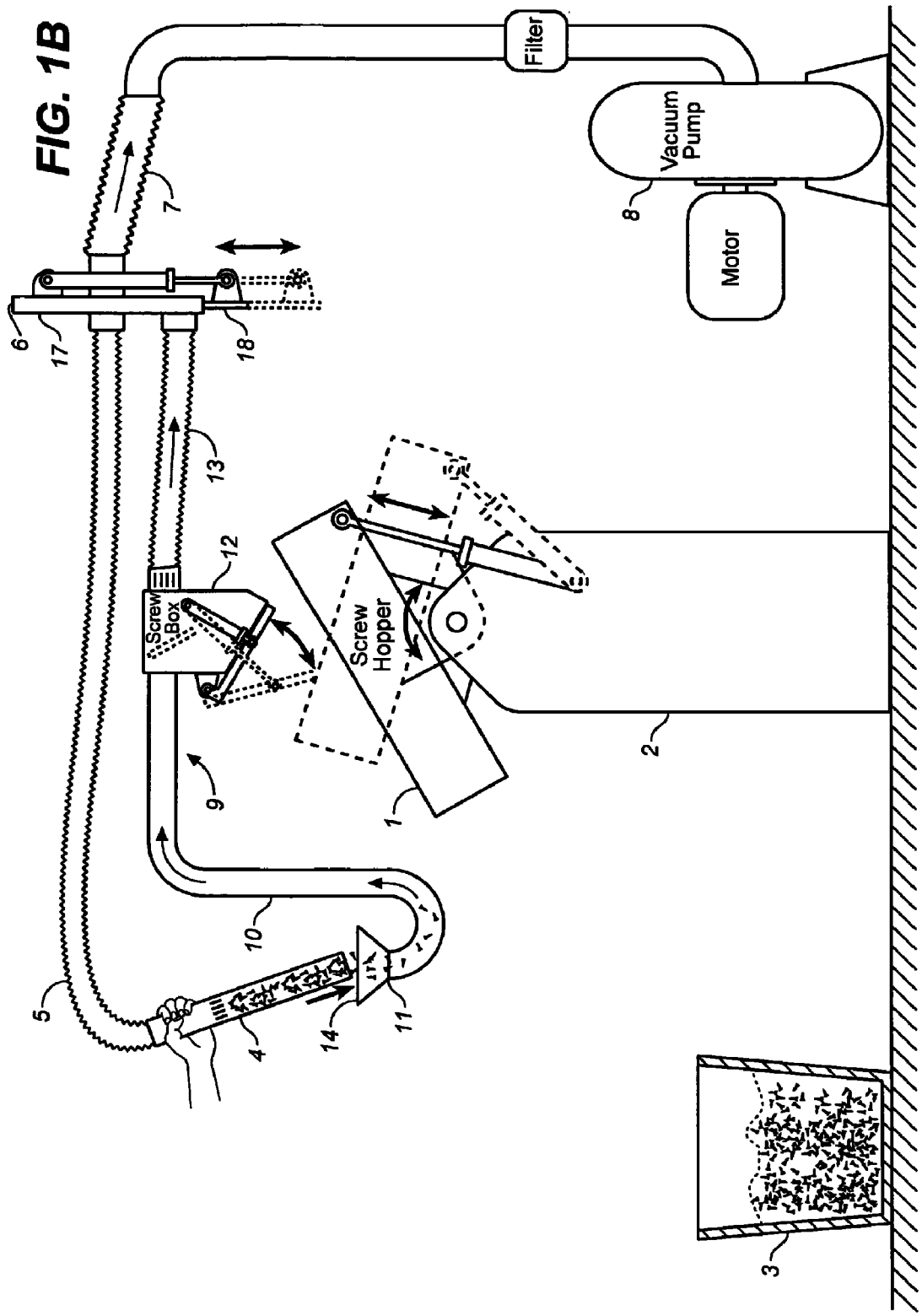

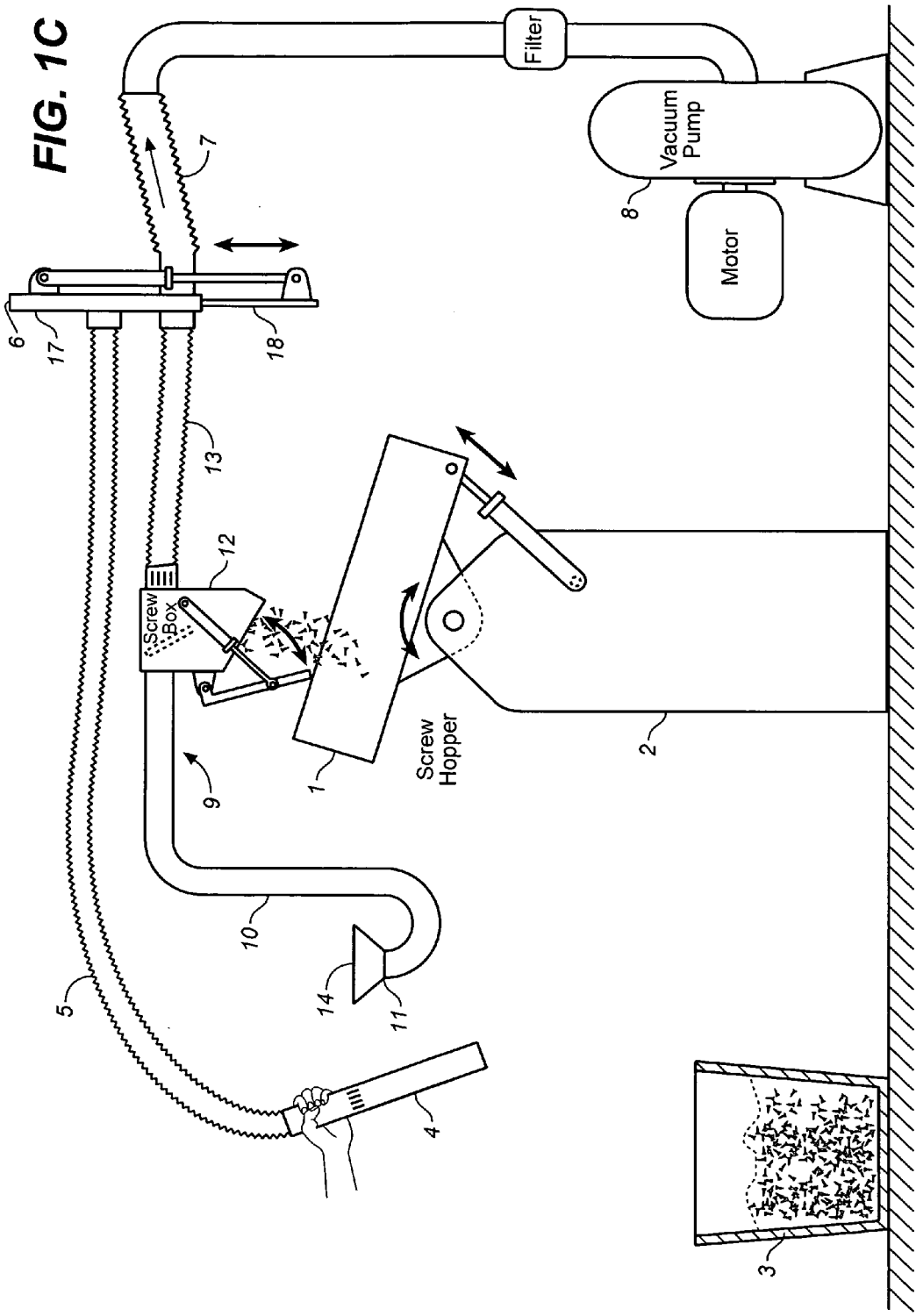

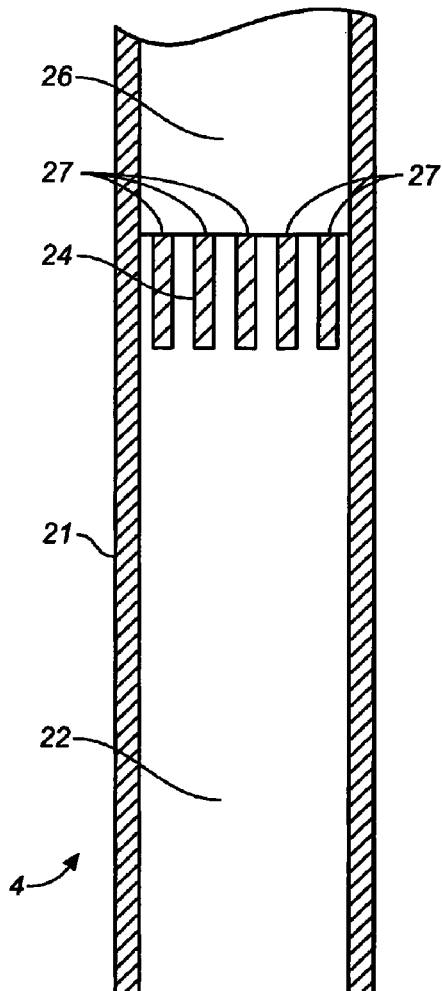
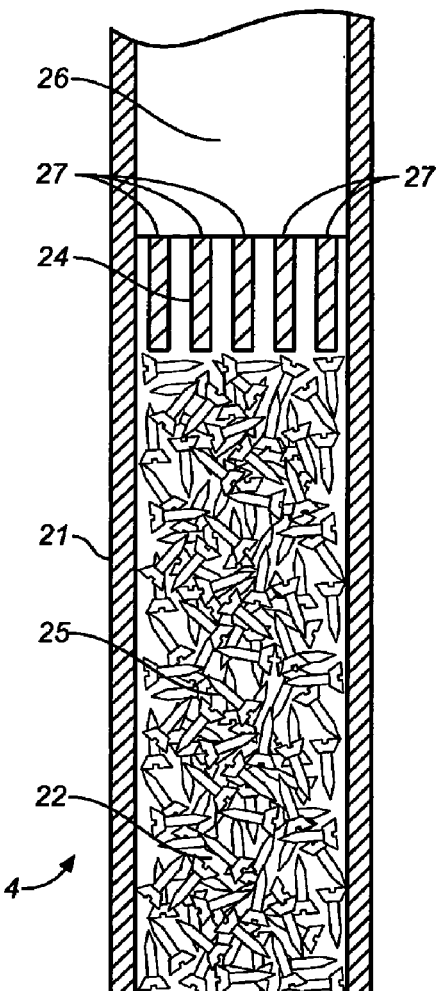
FIG. 3A    FIG. 3B
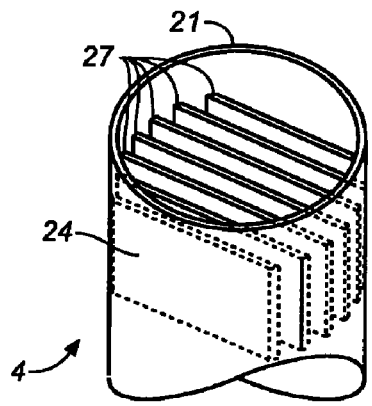
FIG. 3C

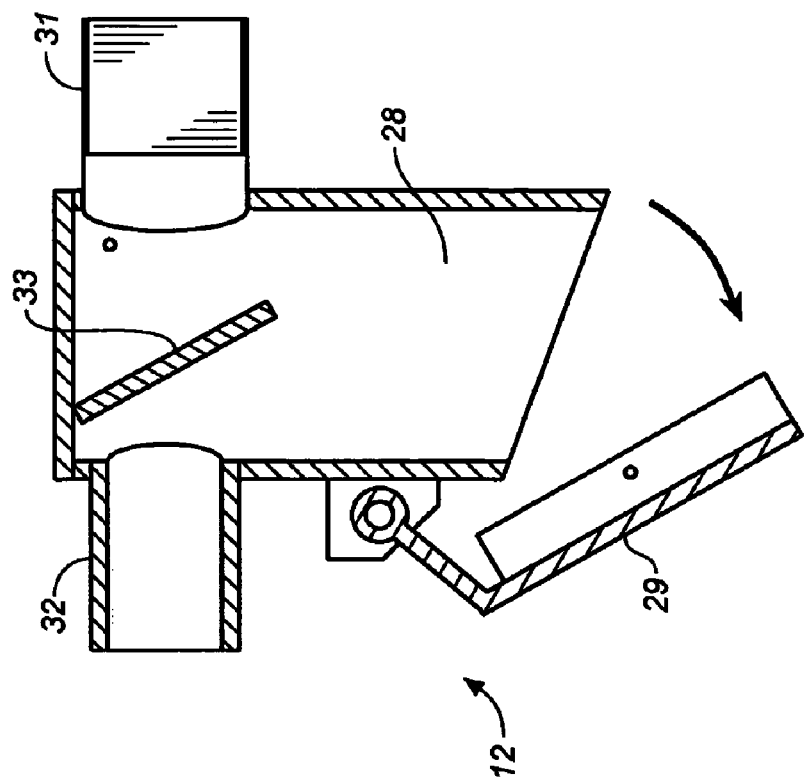
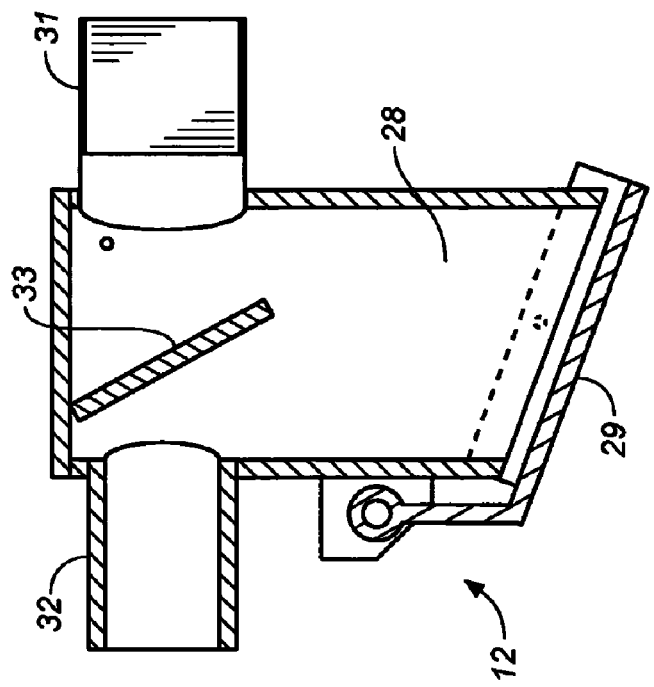
FIG. 4F
FIG. 4E

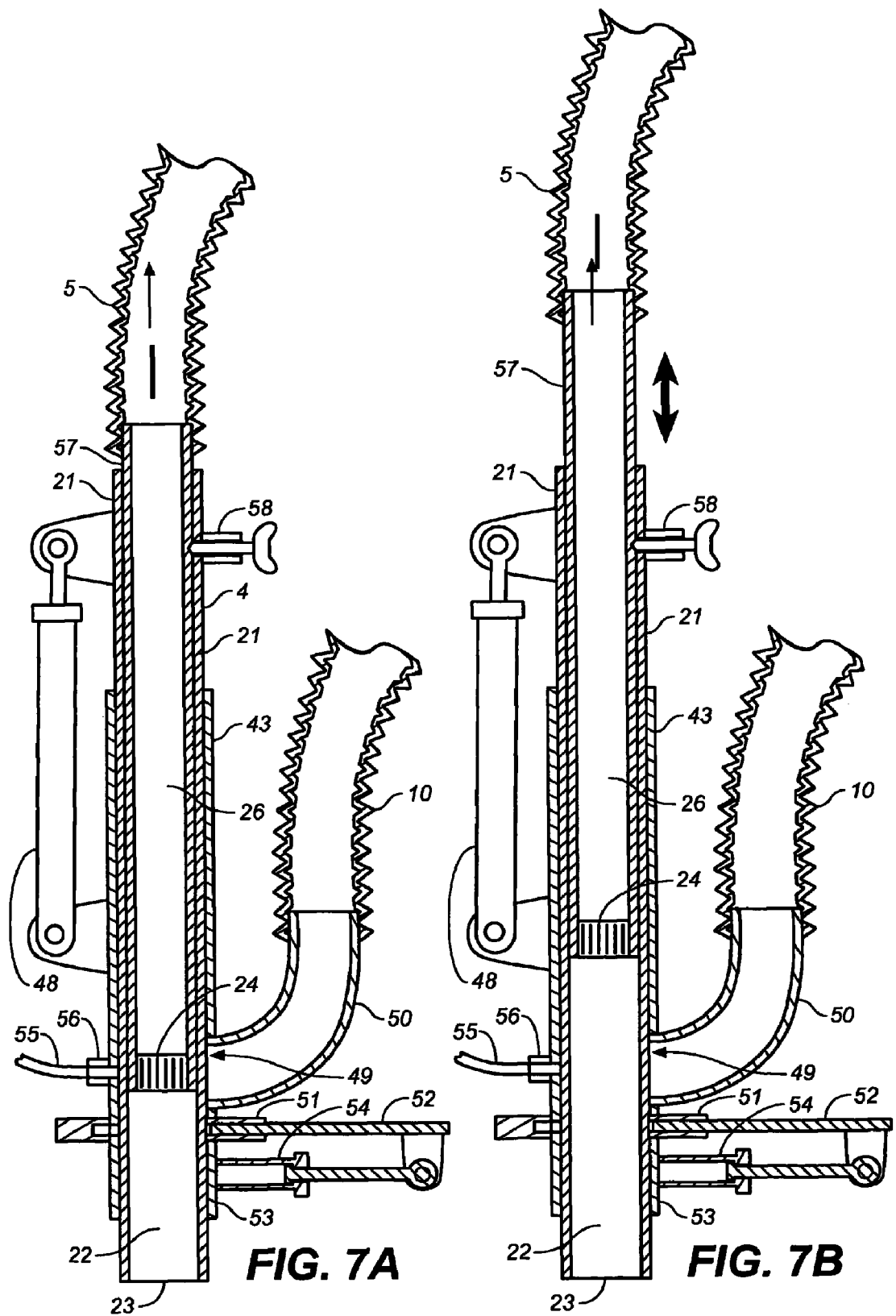

APPARATUS FOR EXTRACTING AND DELIVERING ARTICLES IN AMOUNTS OF UNIFORM SIZE

BACKGROUND OF THE INVENTION

This invention relates generally to handling articles, and especially those for industrial and other uses and particularly fasteners and other articles that are of complex shape and do not flow easily when grouped together in a mass. Threaded fasteners, namely, fasteners having a shaft with an enlarged end or head and a threaded section along the shaft, such as screws and threaded bolts. Such fasteners are used in many fabrication operations in many industries are in this category.

In automatic fastening operations a mass of fasteners, in an appropriate size, is placed in an apparatus, such as a screw feeder, that collates the fasteners and then feeds them consecutively to one or more fastening devices at fastening locations. An additional charge of fasteners is fed to the apparatus each time its supply of fasteners runs out or when all of the fasteners in the machine have been removed for changeover to a different kind or style of fastener. An amount of fasteners is supplied in each charge to meet the capacity of the machine for fasteners without supplying more than the machine can handle.

Fasteners for use in larger quantities, such as in automatic fastening operations, are typically supplied in bulk to users as a jumble of fasteners in a box or other package. Some supply boxes contain a quantity of fasteners appropriate for charging a particular type of fastener feeder and the box can thus be used to supply the measured amount for charging, as by emptying the contents into the screw feeder by hand. However, in sustained operations, a changeover of fastener types is required periodically. Thus a large unmeasured amount of each fastener type accumulates in a mass that must be portioned out by hand into proper charges and serially fed by hand into the article feeder. Moreover, in either case, feeding the charge by hand is time-consuming, particularly where the article feeder is at an elevated or otherwise difficult location.

Accordingly, it would be desirable to have the mass of screws automatically parceled out or metered into the desired amounts and transported as groups to automatic fastener feeders or other applications. However, industrial fasteners are typically elongate or oblong with enlarged heads or other protuberances, particularly screws with their helical threads. Such fasteners in a mass exhibit a peculiar and unique rheology. In the mass these articles tend to interlock which inhibits flow of the articles. Pressure applied to the mass, indeed even the weight of the screws alone will cause the mass to become cohesive, thus inhibiting flow of and penetration into the mass. Consequently, it can be difficult to pour fasteners from a mass, grab or otherwise extract a desired quantity of fasteners from the mass. This also makes these articles difficult to transport and meter or quantify in bulk such fasteners, particularly in an automated approach.

Vacuum devices have been widely used to pick up, transport and deposit a desired sites many kinds of articles, including various types of fasteners, such a blind side fasteners. Typically these devises have a conduit having a mouth or orifice sized to be smaller than articles to be picked up so that the articles do not enter the conduit, itself. For example, as shown in U.S. Pat. No. 6,688,489, each fastener may be separately picked up and transported by a vacuum nozzle. However, these devices are sized to handle only a single fastener and contemplate only picking up and moving a single fastener individually one at a time, the vacuum nozzle attaching to a flat surface of the fastener (the head). The nozzle is designed with an opening smaller than the fastener head so that, when the fastener becomes attached, there ceases to be any vacuum communication with other (adjacent) so that the attached fastener can be isolated and transported on the nozzle by itself. Moreover, the fasteners must be first collated for individual pick up. Thus, this vacuum approach is not suitable for dealing with a mass of uncollated fasteners.

Some conventional vacuum cleaners, such as some shop vacuums, are capable of sweeping up debris, including, dirt and small objects such as bolts, screws and the like, into a tank in which a vacuum is maintained. Such machines typically employ wands that are integral with the machine or attached through a flexible hose to a hand held implement for sweeping surfaces, to scour surfaces and dislodge debris for pick up by the wand mouth of dirt and debris on surfaces (e.g. rugs or floor surfaces) against which such vacuum wands are applied. These wands typically comprise brushes or rotating rug beaters. However, such units have no capability of or purpose for segregating into measured quantities any such sweepings. Nor have these vacuums any capability for depositing such measured quantities at a location exterior to the vacuum tank. Typically these cleaners are for collecting dust, dirt and small particles, rather than substantial quantities of discrete articles. In the case of cleaning the dust from fragile manuscripts it has been recommended to interpose cheesecloth between, the vacuum wand and the sweeping brush to avoid pick up of and injury to the manuscript.

Vibratory processing equipment is utilized widely in industry for a variety of purposes. These include vibratory feeders and particularly vibratory bowl feeders for feeding individual components, including fasteners. Such feeders typically segregate individual components from a mass and convey them along tracks to form a continuous stream of the components that is fed to a downstream location for further processing and utilization. Such feeders would require additional equipment to separate the stream into discrete measured groups of components and would be an inefficient way of segregating and conveying measured groups of components from a mass.

SUMMARY OF THE INVENTION

This invention relates to collecting or extracting amounts or groups of articles thereof of a predetermined, predictable size from a mass of the articles and serially depositing the groups at a desired site particularly at a site where they may be further processed, handled or otherwise employed for the applications. It is particularly applicable to fasteners, especially externally threaded fasteners such as screws and threaded bolts, used in large quantities in industrial applications. These include typical hinge screws used generally in standard sizes 7 to 11 and having lengths typically between one half and one and one half inches. In this invention the amounts or groups extracted are of a uniform volume or charge. The exact number of individual articles in each charge may vary to some degree, depending upon physical characteristics of the particular articles and how they pack together in handling. However, the variance in a number count is typically small and acceptable for most practical purposes.

In this invention is employed a vacuum implement or appliance for collecting a measured charge of articles and dropping this charge at a site for further processing. The implement typically has a rigid housing or casing that contains a charge collection chamber extending from a mouth at the operating or forward end of the implement for a distance to a barrier or diaphragm that closes off an opening or vent at the back end of the charge-collection chamber. The barrier is air permeable but blocks the passage therethough of articles. A back chamber immediately behind the barrier in the housing extends further along the implement and connects to a vacuum source exterior to the implement, typically through a flexible or rigid conduit.

With the vacuum source activated, the implement may be moved to bring the open suction end or of the implement into the vicinity of the upper surface of a mass of articles to extract articles into the mouth to fill the charge-receiving chamber. It has been found that an implement with a charge-collection chamber sized and configured properly for the articles to be extracted and an appropriately high vacuum, the inward air flow rate at the mouth is such as to cause an entraining force sufficient to overbalance the gravity pull on the articles in the charge-collection chamber and hold them in the chamber even with the implement held with mouth facing downward and the chamber vertically thereabove. Below the mouth, outside of the charge-collection chamber, the airflow rate drops off rapidly such that outside the mouth the flow is insufficient to hold articles outside the mouth against the mass of articles held inside the charge-collection chamber and extending up to the mouth. The articles will remain in the charge-collection chamber with the mouth facing downward even when the charge-collection chamber mouth is separated from the article mass with the mouth directed downwardly. This permits the implement to segregate from the mass a measured amount of articles so that the implement may reproducibly transmit to the desired site a specific charge of the articles. At this site, the implement mouth may be held above a primary charge-receptacle receiver or receptacle and the vacuum in the charge-collection chamber broken to cause the charge to drop to the receptacle. For breaking the vacuum, the receptacle may be disconnected from the vacuum source and/or a valve in the implement or a vacuum line to the implement may be opened to the atmosphere.

Advantageously, the vacuum implement, and particularly the suction head thereof, is rigid, straight or with only gradual bends. The head of the implement, i.e. the suction end to the mouth, may, advantageously, be of tubular configuration. The tube may be multisided (rectangular, hexagonal, etc) but preferably is round from the mouth at the suction end to the rearward end of the charge-collection chamber. Particularly for one mode of the invention, as will be discussed, the suction head is relatively thin walled, with the mouth extending generally transverse to the principal axis of the suction end.

Desirably the interior of the article collection chamber is of a regular shape, preferably smooth walls without sharp bends or ledges, so that flow of air and articles between the mouth of the implement and back end of the chamber is unrestricted, in order to first insure ease of filling the chamber with articles upon application of a vacuum and then releasing the articles, without hanging up, to fall down out of the chamber when the vacuum is broken. The enclosure is desirably rigid, with a wall or casing, preferably cylindrical, extending generally linearly from the mouth to the back end establishing a linear airflow direction from the mouth end and the back end of the charge-collection chamber.

To avoid impeded flow at the mouth and along the chamber, the clearance transverse to the flow direction from the mouth to the air permeable barrier is desirably at least twice the length of the articles to be picked up and transported.

The greater the cross-sectional area of the charge-collection chamber at a given chamber length in the flow direction from the mouth to the pervious barrier, the higher the vacuum source capacity that is required to maintain a full charge in the chamber the greater the chamber length at a given chamber cross-sectional area, the greater the vacuum required to maintain the charge. At higher and higher chamber lengths and transverse cross-sectional areas, the vacuum requirements may go beyond the capacity of reasonably available vacuum sources.

In the case of a vacuum implement for handling typical hinge screws the clearance between the sides of the charge-collection chamber transverse to the length of the charge-collection chamber in the flow direction, between the mouth and the air-permeable barrier desirably is at least one inch and less than 5 inches and preferably between two and four inches. The length in the flow direction between the mouth and the diaphragm is desirably at least one inch and less than 30 inches and preferably in the range of about two inches and twenty inches. The volume of the charge-collection chamber will depend upon the size of the charge desired and is preferably between about 10 and 50 cubic inches. For this application the implement is preferably tubular, preferably with an internal diameter of at least about one inch and desirably between two and four inches. For handling articles of smaller size, the mouth and charge-collection chamber dimensions would desirably be correspondingly smaller.

Desirably, the implement is provided with the facility to adjust the volume of the charge collection chamber so that the implement is capable of collecting and transporting to a receiver charges of different volumes, as selected. For this purposes the means may be provided in the chamber to make the chamber shorter and longer. An inner tube may be provided that has a longitudinally slideable inside the chamber wall. Such an insert tube section may be of a slightly smaller diameter than the chamber so that it slideable and telescopes within the chamber. The insert may be slid forward to partially extend forward of the mouth a desired amount and fixed at that position to essentially lengthen the chamber, with the forward end of the insert then becoming the mouth. Alternatively, the air permeable may be omitted in the chamber itself and, instead, be secured inside and across the inner tube at an intermediate location therealong. This inner tube would be placed to project partially beyond the end of the implement distant from the mouth and the vacuum supply line would be attached to the projecting end of the inner tube. Adjusting the distance by which the inner tube protrudes would in turn increase or decrease the effective length of the chamber thus formed.

The air-pervious intercept barrier screen or diaphragm provided at the back end of the charge-collection chamber has opening sizes small enough to prevent individual articles from moving through the screen and out of the charge-collection chamber but large enough in surface area to minimize the pressure drop there across. Thus, to maximize airflow created by the vacuum at the upper end, the barrier screen extends over a substantial portion of the area at the upper end of the housing.

The air-permeable barrier may be of various constructions, for example, mesh or perforated or slotted sheet screens. Advantageously the barrier may be a grate, composed parallel or crisscross bars or fins In all cases the barrier construction must be strong and rigid enough to withstand the impact of articles moving up the vacuum charge-collection chamber from the mouth of the implement and the load of a mass of articles filling the chamber and pushing against it by the pressure differential. Advantageously, the barrier is composed of metal or high strength engineering plastic. Thus, the barrier, construction design and materials and surface area is desirably selected to provide the minimize pressure drop across the diaphragm consistent with the necessary strength. For use for handling typical hinge screws Nos. 7, 8 and 9, a grate diaphragm consisting of parallel adjacent fins across the charge-collection chamber transverse to the flow direction in the chamber with their major fin axis parallel with the flow direction.

The back chamber behind the diaphragm is sized to promote airflow into and through the implement and desirably extends in the airflow direction from the diaphragm. To promote flow, the back chamber has a cross-sectional area transverse to the flow direction equal to or greater than that of the diaphragm and extends in the flow direction for a distance equal to the minimum distance across the diaphragm or greater. A high capacity vacuum source is desirable to achieve a suction force sufficient for the downwardly facing implement mouth to pick up and the charge-collection chamber to hold the articles against the force of gravity. For metal articles, such as hinge screws, a vacuum source with a capacity to generate a free flow volume of air desirably above 50 cubic feet per minute (cfm), and preferably above 100 cfm and a maximum vacuum achievable desirably above 10 inches of water and preferably above 40 inches of water.

Another important part of this invention concern extraction of groups of articles from the mass of article typically jumbled together in disarray. The elongated character and the projections on the articles, such as screw or bolt heads and screw threads, cause interlocking that can greatly impede flowability. The weight of the articles, typically metal, pressing down on lower fasteners in the mass further impedes flow. Tipping the entire mass usually can loosen only individual fasteners at the surface. Even then there can be such resistance that there will be no flow until the surface is at an angle that an uncontrollable avalanche of fasteners occurs. Thus, simply attempting to take out directly measured quantities of screws by attempting to pour out fasteners by simply tilting the mass, without more, is usually infeasible or impracticable.

In this invention these problems are overcome by providing means for disentangling from the mass and mobilizing fasteners near the upper surface of the mass in the vicinity of the mouth of the implement, which is held at the upper surface of the mass. Mobilization is effected by providing means to create relative motion between fasteners close to the upper surface of the mass. The mouth of the implement and the mobilized fasteners are moved relative to each other to bring them into proximity so that the air flow into the mouth of the implement will entrain the mobilized fasteners and draw them into the chamber of the implement. More specifically, means are provided for physical stirring or agitating the near surface fasteners or for tipping the mass about its upper surface in a manner to mobilize and direct the mobilized fasteners into the implement mouth.

For effecting mobilization in accordance with this invention a container is advantageously employed for holding the mass of fasteners to be the source of the groups of fasteners to be formed and transported. The container is configured to accommodate implement access to the interior thereof. Therefore, the container is provided with an access opening substantially above the bottom or base thereof, and desirably at the top. The interior of the container below the access opening constitutes a reservoir for holding a mass of the articles. The opening is large enough and its location is such as to allow the suction end of the implement to access the interior from at or above the surface of the fastener mass, even when the reservoir is full, and, in some embodiments, to move downwardly in the container toward the bottom to follow the surface of the mass in the reservoir, as the mass is depleted by serial removal of groups of fasteners by the implement. Advantageously, the reservoir is large enough to hold a large number of charges for the implement.

The reservoir of the container desirably has, over a substantial portion of the height thereof, a large enough cross-sectional area transverse to the vertical axis so that, when the reservoir is filled with the mass of fasteners, there is a sufficient upper surface area of the mass to permit effective agitation and pick up of fasteners at the upper surface by the implement mouth to fill the implement charge-collection chamber. For this purpose, the transverse cross-sectional area of the container is at least five times the cross-sectional area of the mouth of the implement. Advantageously, the container is cylindrical or upwardly concave Preferably, for handling typical hinge screws, the transverse cross-sectional area is at least 70 sq. inches.

In an advantageous mode of this invention, mobilization of the fasteners is created by means at the head of the implement that effects mechanical agitation of surface articles in the mass adjacent the implement mouth, with the mouth at the surface of the mass. This may be effected by moving the implement across the surface of the mass with mouth slightly penetrating into the surface of the mass, preferably about one quarter to one inch deep. The apparatus may include a container containing the fastener mass set up for rotation about its vertical axis and supports for holding the implement and moving the implement vertically to lower the implement mouth and maintain it immersed below the surface of the mass. When the implement chamber is fully charged, the implement may then be raised to a position for discharge of the fasteners.

Advantageously, for the foregoing mode of agitation, the forward terminal end of the implement head is tubular to the mouth, with relatively thin tubular wall, desirably with a thickness of less than one tenth, and preferably less than one twentieth, of the width of mouth at its narrowest. An implement head that is transversely broader and more flat adjacent the terminal end may tend to ride over the surface of the mass without causing agitation at the mouth. However, a broader terminal configuration may be employed by providing, as the agitation means, narrow fingers or the like spaced apart around the peripheral edge of the opening and projecting forward thereof, preferably between one quarter inch to an inch. Optionally, the mouth may be at a canted angle to the suction end axis or provided with rake-like or other projections if desired to assist mobilization of fasteners at the surface of the mass as the suction end is moved along the surface.

The foregoing procedure may be carried out by hand but preferably an apparatus is employed to cause the implement mouth to move relative to the mass surface, to cause the mass surface to move relative to the implement mouth position or both and for moving the head away from the surface to a position above a receptacle for depositing the charge. Such apparatus or support means desirably includes a carriage for holding and manipulating the implement.

As charges of articles are removed from the reservoir by the implement the surface level of the article mass will change, so it is desirable that the support means for the implement automatically adjusts the positioning of the implement to maintain the implement mouth at the mass surface level as that level changes. Also it is desirable at the same time to keep the implement head from digging too deeply into the mass as this may clog the mouth and impede the stirring action at the mass surface.

To accomplish these objectives, this invention provides means for intermittently applying an upward elevating force on the implement and its carriage that is somewhat greater than the force of gravity on the implement and carriage. The frequency and duration of this elevating force are adjusted so that during each cycle the head of the implement rises to bring the implement mouth a short distance, preferably below one inch, above the mass surface. During the time that the upward force is not applied an upward resistance force is maintained, that is slightly less than the downward force of gravity thus offsetting most of the gravitational force and slowing the downward movement of the carriage and implement. The upward resistance force is adjusted so that that the amount of gravitational force on the implement and carriage not offset by the upward resistance force is still sufficient to bring the implement head back to the surface of the implement mass before the onset of the upward elevating force in the next cycle. In this manner the support means will cause the implement to continuously follow the level of the article mass in the reservoir as it lowers on repeated removal of article charges, Conveniently, double-acting air cylinders, with appropriate controls for providing intermittent action, may be employed as the means to provide both the upward elevating force and the upward resistance force.

With the frequency and duration of the elevating force and the amount of upward resistance force set appropriately, the mouth of the implement will continuously cycle between a position slightly above the mass surface to a position slightly below the surface. Thus, for a substantial portion of the cycle, the stirring element or elements at the head, preferably a tubular forward end of the implement itself, will be engaged with the articles at the surface to carry out the stirring function. Maintaining the cycle as described will also keep the head from becoming buried deeply in the mass and clogging up. Desirably, the elevating force has a duration of one second or less and a frequency of every other second or less.

Depending upon the terminal end configuration of the head and the weight of the implement and associated carriage and support structure, an upward support may be desirable, such as a bearing, such a roller or wheel connected to the implement that rests on the surface of the mass. Such a bearing may serve as a part of the upward resistance offsetting the downward force of gravity and thus preventing the head mouth from sinking too deeply into the mass.

A container for use in the foregoing mode for handling typical hinge screws, the cross-section at the upper region of container transverse to the vertical axis is desirably from about 70 to 250 square inches. Preferably the container is an upright cylinder having a diameter of from about 9 to 20 inches in diameter.

In another important mode of the invention, the means for mobilizing the fasteners at the upper surface of the mass involves agitation generally of the fasteners in the mass. In this mode the mobilization of the mass is desirably effected by a vigorous vibration of the mass. Advantageously, the mass is held in a container that is provided with a vibration generator. A vibrating drive unit causes vibration of the container and consequently agitation of the fasteners within, including those at and near the upper surface of the mass. The thus mobilized fasteners are then picked up in the mouth of the implement held at the surface. An advantage of this mode of the invention is that readily available vibrators may be employed, such as those currently utilized for various treatments of mechanical parts (e.g. deburring) and to facilitate conveyance and dispensing of such parts.

The vibrator drive is mounted in contact with the container to impart vibration thereto. The drive is selected and adjusted to impart an adequate amount of vibration energy at an appropriate amplitude to the container to agitate the fastener mass and mobilize the individual fasteners. Such vibration drives may be operated electromagnetically, pneumatically or mechanically by an electric motor with an unbalanced mass on its drive shaft. A pneumatic drive is preferable for its ability to generate vigorous vibration at higher frequencies and amplitude. The container may be mounted on springs to facilitate vibratory movement thereof by the vibrator drive.

In this mode the implement may be held above the mass with the mouth at the mass upper surface by hand. Advantageously, apparatus similar to that described above for the first described embodiment may be employed. The same means may be used for applying an intermittent upward elevating force and for applying a residual upward resistance force at times when the upward elevating force is not being applied to partially offset the gravitational force on the implement and carriage.

However, in this mode the implement mouth may simply be held at a central point of the upper surface and the implement gradually lowered with the surface as the mass is depleted by serial removal of measured groups of fasteners. It has been found that, with agitation imparted, fasteners toward the periphery of the upper surface will flow in toward the central extraction point as the fasteners are removed at that location. For this mode the container is advantageously of a bowl or inverted cone configuration toward the bottom. The inward slope toward the bottom facilitates migration of fasteners toward the central point of extraction so the container is "self-emptying."

Another way in this invention to mobilize the fasteners at the upper surface of the mass for pick up by the implement is to tip the mass of fasteners to slant the upper surface downwardly to cause the fasteners at the surface to flow in the downward direction toward the periphery of the container. The fasteners flowing off at the surface of the mass are then funneled to the implement mouth while minimizing compressing together of the flowing fasteners. Apparatus for this mode may include a container having an implement access opening outwardly of the vertical axis of the main body of the container and of the center of the container reservoir, desirably at or outwardly the periphery of the main body of the container.

Desirably, the access opening is at the upper end of a projection of the container that extends to outward at one side of the main body thereof, The projection may be in the form of a trough or spout extending outwardly from or as a part of the container sidewall about an opening in the container wall, preferably a slot extending a distance downward from near the top of the container reservoir. The passage or throat of the trough or spout gradually constricts, or funnels, outwardly and upwardly to the implement access opening and the opening accommodates the mouth of the suction end of the implement.

The container is mounted so that it may be tipped downwardly toward the implement access opening so that surface of the fastener mass will reach an angle that causes the surface fasteners to disengage and slide downward into and to funnel through the trough or spout and into the implement, while the fastener mass is held back by the container wall. The container may then be returned to the generally upright or vertical position, at which the charged implement may discharge the fasteners to a receptacle, as will be described below, or be removed from the spout for discharge of the fasteners at another location Desirably, the spout or trough entrance from the main body and reservoir of the container extends over a substantial vertical distance along the container sidewall, preferably most of the distance from the bottom to the top, such as in the form of a vertical slot in the container main body, and the spout or trough slopes upwardly to the opening from the lower margin of the entrance. With this configuration, the mass of fasteners will have side support over most of the vertical distance of the container sidewall during tipping of the container without regard to the fill level of the container. This minimizes the tendency of the mass to cascade during tipping, with consequent plugging of the spout, when there is no side support over that range. Preferably in this embodiment, the mouth or suction end of the implement is of a nozzle configuration and is engagable in and supported by the container at the access opening. The engagement of the implement with the mouth thereof at the opening may be made releasable so that the implement may be engaged and removed by hand for manual operation of the implement.

The container employed preferably has an upright cylindrical configuration or an ovular configuration with oval axis in the spout or trough direction. For handling typical hinge screws, the container desirably has a cross-sectional area at the upper region of the container transverse to the vertical axis is desirably from about 70 to 200 square inches.

As described, the implement, once charged, may be removed and moved to an attitude or location for depositing the fastener charge by releasing the vacuum to the implement charge-collection chamber. With the mouth extending downwardly the charge of fasteners may then be released, by removing the vacuum, to drop to a desired charge-receiving receptacle. Particularly where the charge-receiving receptacle is close by, the implement may be removed either manually or a convenient mechanical means to a discharge position at the ultimate destination for direct discharge into the charge-receiving receptacle. The charge-receiving receptacle is adapted to collect the charge dropped from implement, e.g, through a top opening in the receptacle. Typically, the implement is positioned with its mouth above the receptacle where the charge will drop to the location at the receptacle for receiving the charge.

However, for transport of the charges to an ultimate destination that is somewhat remote, a pneumatic transporter according to this invention may be desirable. Such as system generally comprises a vacuum conduit having an inlet end, a fastener charge drop or feeder at a remote end of the conduit and a vacuum source. The charge feeder comprises a feeder chamber having an inlet communicating with the conduit and an outlet communicating with the vacuum source (generator) and which traps in the chamber the articles transported from the conduit for release to a receiver, such as a hopper or other secondary receptacle, at the remote feeder site for further processing of the articles. Desirably the feeder chamber has a baffle or diverter to divert the flow of fasteners in each charge downwardly and gate or closure which may be opened for dropping each article charge to the receiver.

The inlet of the conduit of the charge transporter is connected to the receptacle so that the receptacle communicates through the conduit with the charge feeder. When the vacuum generator is activated for the feeder, an air flow will be generated from the receptacle to the feeder. The articles from a charge dropped in the receptacle will become entrained and flow into the feeder for delivery therefrom. Air from a compressed air source may also be injected through a nozzle into the primary receptacle at the same time to assist in entrainment of the articles.

For use with a manually manipulated implement, the primary receptacle may simply constitute an upwardly facing mouth, such as provided by the large end of a funnel, stationed near one or more containers for holding a mass of fasteners, into which the implement drops its charge.

For a more mechanized fastener feeder, the charge-receiving receptacle may be operably associated with apparatus used to manipulate the implement for extracting the fastener charge from the fastener mass and separating the implement mouth from contact with the fastener mass. In this arrangement, the charged implement is moved from contact with the fastener mass to a discharge location and the charge-receiving receptacle is moved to and/or formed or assembled adjacent to the implement at the discharge location in position to receive the fastener charge from the implement mouth. After discharge of the charge, the receptacle is moved and/or disassembled to permit the implement to move back to the fastener mass to acquire another charge.

Following is an embodiment of such a charge receptacle for the fastener charge-collection system described above that utilizes a tilting container with a sidewall outlet for feeding mobilized fasteners into the collection end of the implement. In this embodiment the charge transporter receptacle has a charge-collection mouth that extends into the interior of the container and is movable between a retracted position and an engaged position. At the retracted position the mouth is spaced from the implement mouth and does not interfere with fastener collection by the implement. At the engaged position the mouth is positioned with respect to the implement mouth to receive a charge released and dropped from the implement when the can is tilted back to the generally upright or vertical with the implement charged.

BRIEF DESCRIPTION OF THE DRAWINGS

FIG. 1A is a schematic side view of a system, for a first embodiment of this invention, for extracting and delivering a charge of articles of uniform size, illustrating the various components of the embodiment and their organization;

FIG. 1B is the same view as FIG. 1A showing the system in a second operational phase;

FIG. 1C is the same view as FIGS. 1A and 1B showing the system in a third operational phase;

FIG. 3A is a fragmentary expanded cross-sectional view of the charge collection and transporting implement of the system shown in FIGS. 1A through 2B;

FIG. 3B is the same fragmentary expanded view as FIG. 3A but showing the collection chamber of the implement filled with a charge of screws;

FIG. 3C is a fragmentary expanded isometric view of the charge collection and transporting implement of the system shown in FIGS. 1A through 3B;

FIG. 4E is a cross-sectional view taken along the line 4E-4E in FIG. 4D and showing the trap door closed;

FIG. 4F is the same view of the charge feeder as in FIG. 4E but showing the trap door open;

FIG. 7A is the same fragmentary sectional view through the implement, implement sleeve and associated gooseneck fitting as in FIG. 6A but showing a modified form of the implement in which the air permeable barrier is carried on by an inner tube positioned within the implement and slidable therein along the length thereof, with the inner tube being held at a first location along the implement length;

FIG. 7B is the same enlarged fragmentary sectional view of the modified form of the implement as in FIG. 7A but showing the inner tube positioned at a second location, more distant from the mouth of the implement;

DETAILED DESCRIPTION OF THE PREFERRED EMBODIMENT

Figure 2A:
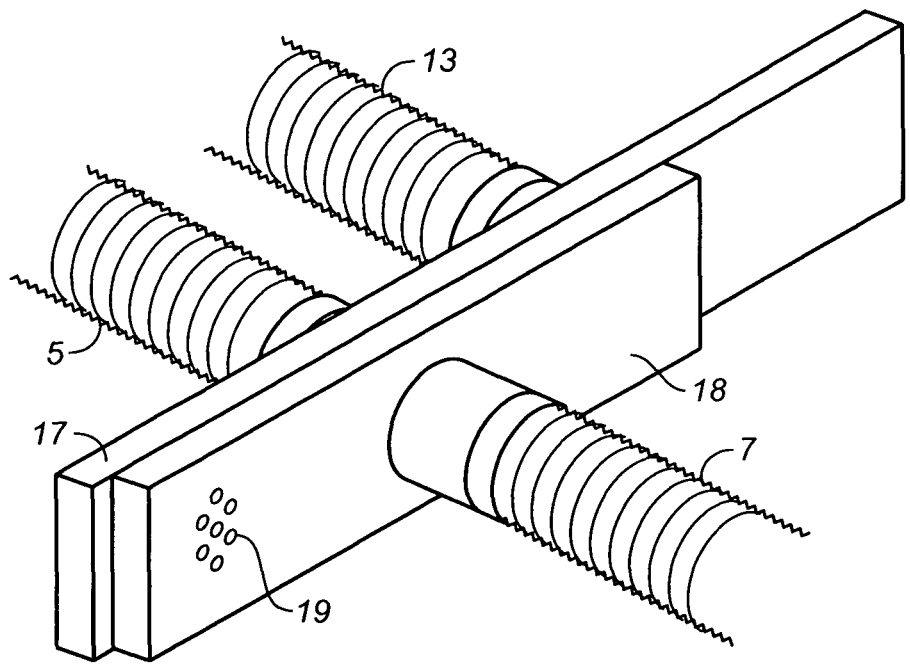
FIG. 2A is an enlarged fragmentary isometric view of the valve of the embodiment of FIGS. 1A through 1C showing the valve in a first operational phase.

The following description illustrates the manner in which the principles of the invention are applied but is not to be construed as limiting the scope of the invention.

The present invention may be practiced in a wide variety of embodiments, under the principles disclosed herein, ranging from embodiments that are partially mechanized and those that are more fully automatic and with a variety of means for mobilizing the articles to be picked up and transported, as shown by the specific embodiments described below.

Referring first to FIGS. 1A through 4F, the embodiment shown is adapted for picking up a measured quantity or charge of screws from a supply of screws in a mass and delivering the charge first to a receiver of an air operated transporter which, in turn, delivers the charge to a remote site for depositing the charge into a receiver at a remote site, in this case a hopper 1 of screw feeder 2 for dispensing and delivering the screws individually to a hinge applicator (not shown) at which they are used. As the screws are delivered during continuing operation of the hinge applicator, the supply of loose screws in hopper 1 of the screw feeder 2 is diminished and must be replenished. The same is true when all of the remaining screws are removed from hopper 1 for changeover to a different kind of screw. In either case the screws added must be in a measured amount (or volume), as feeder 2 will not operate efficiently if too many are added. Since screw feeders are typically mounted above the hinge applicator or otherwise at a site remote from or difficult to reach by the operator, replenishment completely manually requires more operator time as well as machine down time.

As seen in FIGS. 1A-1C, a container 3 is provided for holding a mass of articles for pick up by a screw collecting and transporting implement 4 that is manipulated manually and operates by application and release of a vacuum as will be described. An implement vacuum supply conduit comprising a flexible vacuum hose 5 connects implement 4 to a vacuum distribution valve 6 that, in turn, is connected by vacuum conduit 7 to a vacuum source or generator in the form of vacuum pump 8.

In this embodiment, where the ultimate destination of the screw charges, hopper 1 of screw feeder 2, is somewhat remote from container 3, a pneumatic transporter 9 is provided, cooperating with the primary charge collecting and transporting implement 4 as will be described. Transporter 9 comprises a screw charge conduit 10 connecting an inlet end funnel 11, which may desirably be in the form of a hopper or funnel, a charge drop or feeder 12 and a vacuum supply conduit 13 extending from valve 6 to screw box. Inlet funnel 11 has an upward facing mouth 14 for receiving charges of screws when dropped from implement 4 held above funnel 14. Inlet funnel 11 is placed at a location in the vicinity of container 3 convenient for the operator to move implement 4 between container 3 and funnel 11 and within the reach of flexible hose 5 attached to implement 4. For convenience charge conduit 10 may take the form of a flexible hose at the inlet end. But desirably, over its middle reach and to the charge feeder 12, the charge delivery conduit is rigid and smooth-walled particularly where it extends upwardly and where it is curved. This will reduce friction and avoid detrainment of the screws.

Figure 2B:
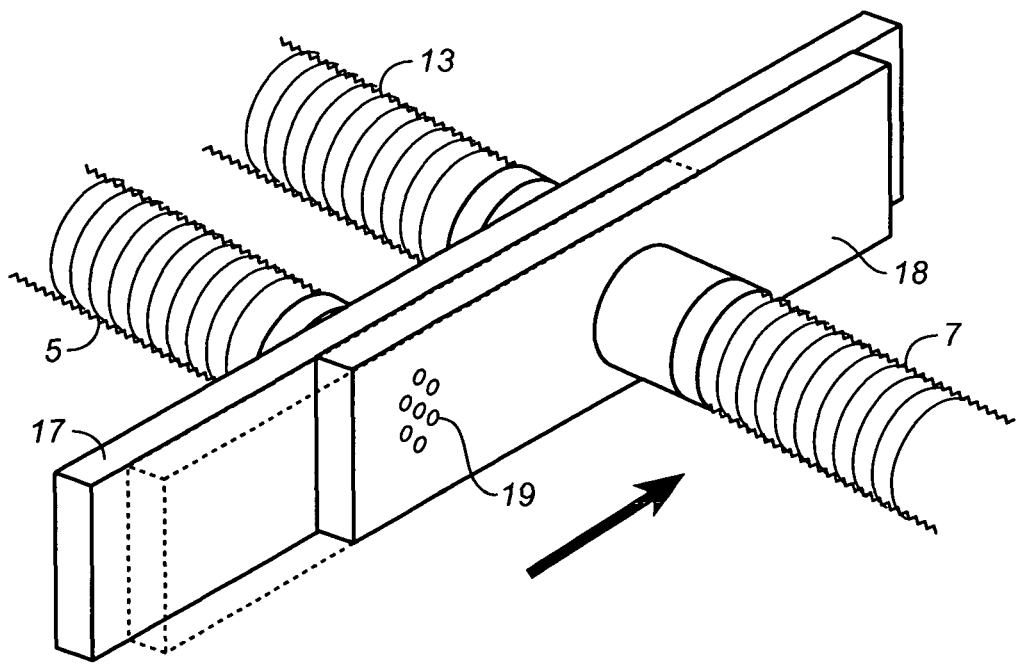
FIG. 2B is the enlarged fragmentary isometric view of FIG. 2A showing the valve in a second operational phase.

As seen in FIGS. 2A and 2B, valve 6 comprises a stationary plate 17 and slide plate 18 that are mounted in side-by-side relationship, with plate 18 being slideable longitudinally against and along plate 17. The adjacent ends of hose 5 and vacuum supply conduit 13 are each attached to the side of plate 17 opposed to side against which plate 18 slides, in side-by-side relationship, each at a circular opening or port in plate 17 to permit air flow through plate 17 to and from hose 5 and vacuum conduit 13, respectively. The adjacent end of vacuum supply conduit 7 is attached to the side of plate 18 opposed to the side of the plate that slides against plate 17, at a circular opening or port in plate 18 to permit airflow through plate 18 to pump 8. The port for conduit 7 is positioned to line up, alternatively, at different positions of plate 18 along its slide path against plate 17, alternatively, at a first position with the port for hose 5, at a second position with the port for conduit 13. Plate 18 also has a cluster of holes 19 therethrough at a location side-by-side with the port for conduit 7 that will line up with the port for hose 5 when plate 18 has been moved to the second position of plate 17, as which the port in plate 17 for conduit 13 lines up with the port for conduit 7 in plate 18.

Referring now to FIGS. 3A and 3B regarding the structure of implement 4, the body of implement 4 is a straight, thin walled metal tube 21 of 2 inch diameter. Unfilled with articles the tube is hollow over a section comprising an article collection chamber 22 that extends from the free end, mouth 23, for a distance of 10 inches, to an air permeable barrier 24. As depicted in FIG. 3B, chamber 22 has been charged with a full screw charge 25, extending from the edge or lip of mouth 23 to barrier 24, completely filling chamber 22.

Barrier 24 is comprised of side-by-side parallel 16 gauge steel blades 27¾$^{th}$ of an inch deep with a minimum spacing therebetween of ³⁄₁₆$^{th}$ of an inch, the ends of the blades being engaged in slots in the wall of chamber 22.

Behind barrier 24 and extending to the rear end of the tube section is back chamber 26 that in turn is connected at the back end of vacuum hose 5 for applying, through back chamber 26 and barrier 24 a vacuum to chamber 22.

Figure 4A:
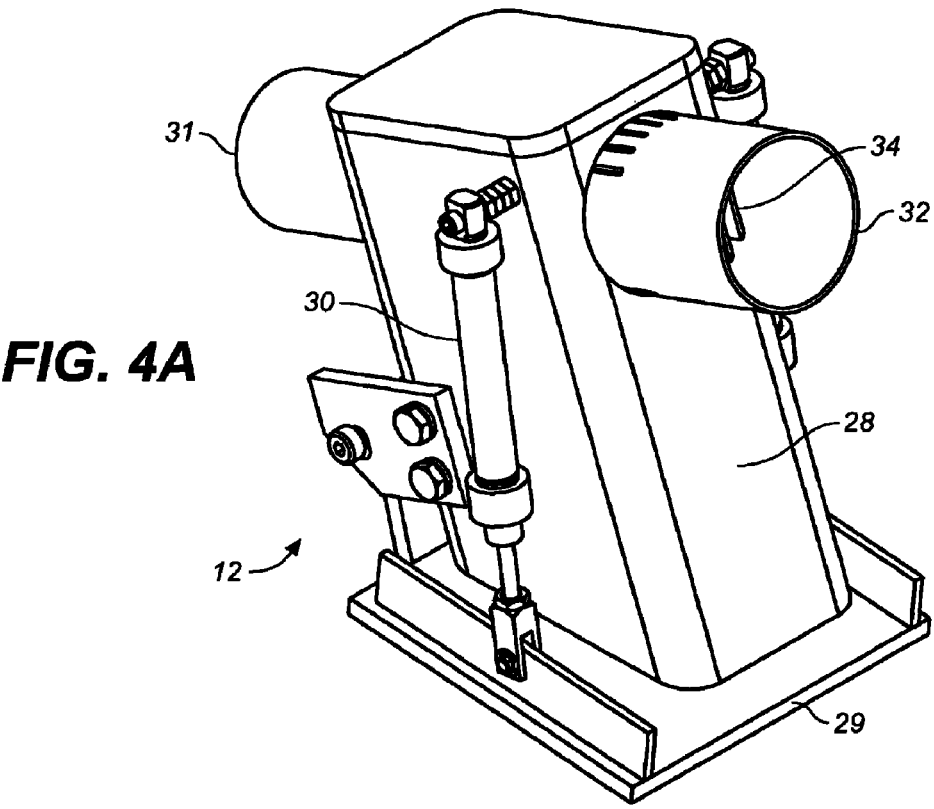
FIG. 4A is an isometric view, in isolation and looking from the inlet side, of the charge feeder of FIGS. 1A through 3B.
Figure 4B:
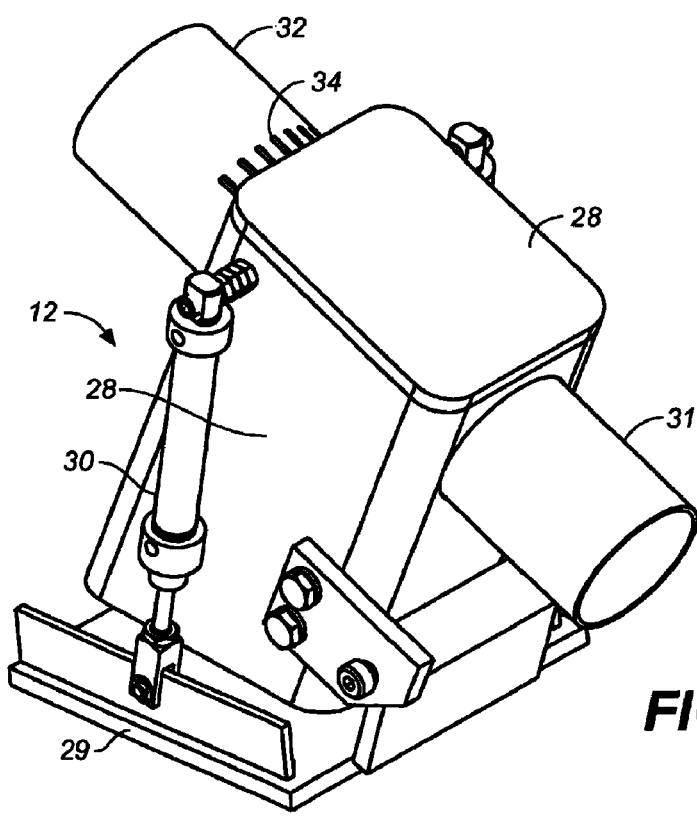
FIG. 4B is an isometric view, in isolation and looking from the outlet side, of the charge feeder of FIGS. 1A through 4A.

As shown particularly in FIG. 4A through FIG. 4F, charge feeder 12, shown here in isolation from the rest of the pneumatic transporter, comprises a screw box 28 having a hinge mounted trap door 29 normally closing off the bottom thereof and an air cylinder 30 for opening and closing door 29. An inlet fitting 23 is located near the top of an inlet side of the box for securing to an end of charge conduit 10 for air communication with box 28 and an outlet fitting 32 is disposed near the top of an outlet side of box 28, opposed to the inlet side, for securing to an end of vacuum supply conduit 13 for air communication with box 28. In FIG. 4E charge feeder 12 is shown with door 29 in the closed position for receiving through the inlet under vacuum imparted from vacuum imparted by vacuum conduit 13 and in FIG. 4F charge feeder 12 is shown with door 29 in the open position for dropping a screw charge to receiver such as hopper 1.

As shown in FIGS. 4E and 4F, box 28 contains a baffle 33 interposed between the inlet and outlet for deflecting downward the flow from the inlet and decreasing the momentum of entrained screws in the direction of the outlet and promote dropping of the screws entrained in the airflow to the bottom of box 28. Desirably, the cross-sectional area in the box transverse to the inlet flow direction is a multiple of the cross-sectional area of the inlet, at least double and preferably 4 or more times the inlet area, so as to slow the velocity of the air entering from conduit 10 so as to promote detrainment of the screws causing them to drop.

Figure 4C:
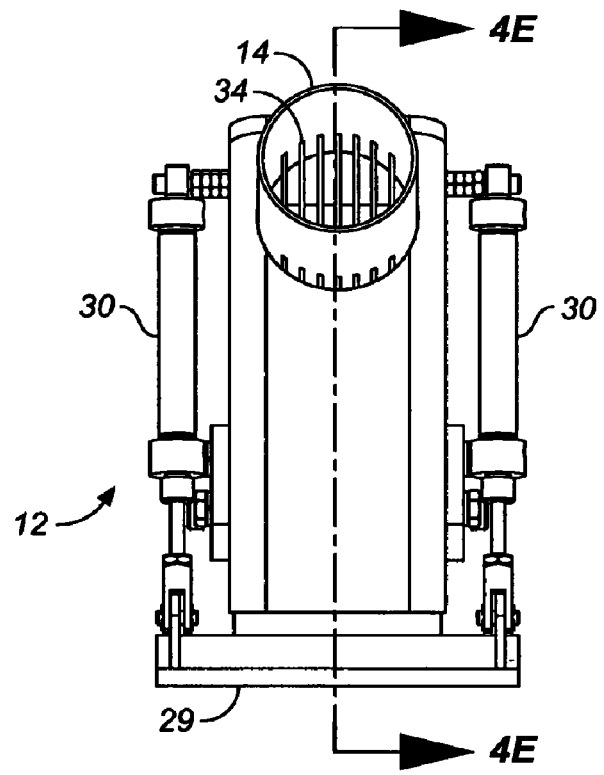
FIG. 4C is a side view, in isolation and looking from the outlet side, of the charge feeder of FIGS. 1A through 4B.
Figure 4D:
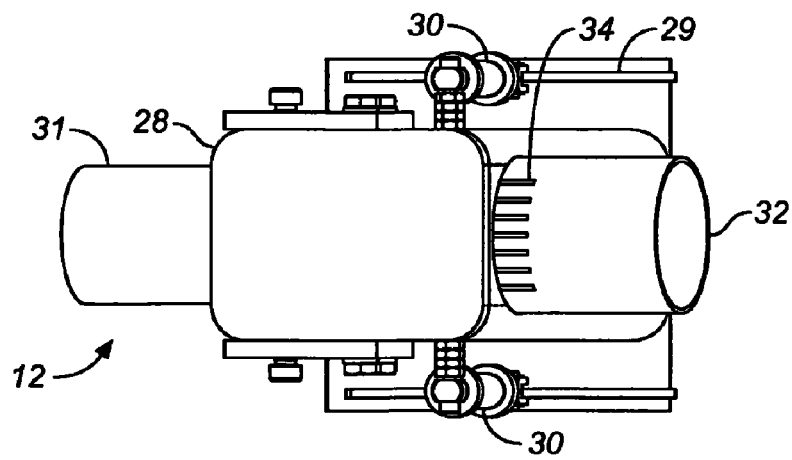
FIG. 4D is a top view, in isolation, of the charge feeder of FIGS. 1A through 4C.

As seen especially in FIG. 4C, an air permeable barrier 34 having openings small enough to preclude the passage therethrough of screws extends across the interior of outlet fitting 32 preclude the passage through outlet fitting of stray screws that do not fall to the bottom of box 28. This is for safety to prevent damage to pump. The construction of barrier 34 is the same as that for barrier 24, the barrier blades being secured in slots along the perimeter of the wall of outlet fitting 32.

To supply an adequate vacuum at a sufficient flow rate for implement 4 to collect and retain a full charge of screws, a vacuum pump 8 having the capacity to produce a flow rate of up to 206 CFM and induce a vacuum of up to 118 inches of water is employed. Specifically, a pump having this capacity is ring compressor model VFC600A-7W supplied by Fuji Electric Co. Ltd., Tokyo<Japan.

Operation of the embodiment of FIGS. 1A through 4F proceeds as follows. Container 3 is first provided with a mass of the desired screws. Pump 8 is then activated and sliding connector plate 19 of valve 6 is slid to the first position to bring the port in plate 18 for vacuum conduit 7 into alignment with the port in plate 17 for vacuum hose 5, as shown in FIG. 1A. Implement 4 is brought down into container 3 by the operator, with the mouth facing downward, to bring mouth 23 to the surface of the screw mass and moved laterally across the surface of the screw mass, with mouth 23 just below the surface, to mobilize and collect the loosened screws, also as shown in FIG. 1A. Minimum downward pressure is applied so implement 4 is maintained with mouth 23 immersed only a slight distance below the surface of the mass, desirably less than one inch and preferably about one half inch or less. Too great a downward pressure against the mass can compact the screws and make them less mobile.

When chamber 22 becomes completely filled, the fully charged implement is lifted up out of container 3 and moved by the operator to position it over funnel 14 with mouth 23 facing downward, all while maintaining the valve at the same setting so that vacuum continues to be applied to the implement. The entrainment forces of the substantial airflow caused by the vacuum will maintain the chamber 22 fully charged during movement, even with mouth 23 facing downward. As will be observed in FIG. 2B, a uniform, well-packed charge can be achieved, with a sharp cut off at the edge of the mouth.

As shown in FIG. 1B, implement 4 is then positioned over funnel 14 and connector plate 18 of valve 6 is slid to the second position, to bring the port in plate 18 for vacuum conduit 7 into alignment with the port in plate 17 for vacuum supply conduit 13 for screw charge feeder 12 and the port for hose 5 into alignment with the cluster of holes 19. The vacuum through hose 5 to implement 4 is thereby broken, causing screw charge 25 to begin dropping into funnel 14, also as shown in FIG. 1B. At the same time, at this valve setting, a vacuum is imparted through charge conduit 10 causing airflow to funnel 14 to entrain the screw in the charge dropped from implement 4. In this flow the entrained screws travel to screw box where they enter to be deflected downward by baffle 33. The reduction in screw velocity created as the screws impact the baffle, plus the reduction in air velocity due to the larger cross-section and volume of box 28 over that of hose 5, cause detrainment of the screws from the flow and they drop to the bottom of box 28. Funnel 14, cooperating with vacuum hose 5 and charge feeder 12, thus constitutes and functions as a receptacle for receiving and controlling charges dropped from implement 4.

Valve 6 is actuated to return it to the first position to relieve the vacuum in charge feeder 12. Air cylinder 30 may then be actuated to open trapdoor 29, whereupon the charge of screws now residing at the bottom of box 28 fall from the box into hopper 1. Cylinder 30 is again actuated to close door 29 and the operator may bring implement 4 back to container 3. A new cycle can then be initiated or vacuum pump 7 deactivated Turning now to FIGS. 5A through 9, theses drawings illustrate an embodiment of the invention that is more fully automatic. In particular, this embodiment includes novel means for manipulating the implement for pick up and delivery of charges. More particularly, apparatus is provided that manipulates the charge collecting implement to bring the mouth thereof to and about the surface and of the screw mass in a manner to cause pick up by the implement a full charge of screws and to bring the charge away from the mass surface to a location for dropping the charge. In this particular embodiment apparatus is provided for receiving and pneumatically transporting to the ultimate destination the charge dropped from the implement. In this embodiment the implement, charge drop, pneumatic plumbing, the valve and vacuum generator have essentially the same construction as for embodiment of FIGS. 1A through 4F so the reference numbers in the drawings for these items remain the same as for the first embodiment. Implement 4 is also essentially identical that in the previous embodiment except that that the back chamber 26 is somewhat longer to cooperate better with the associated structure for further automating the system.

Figure 5A:
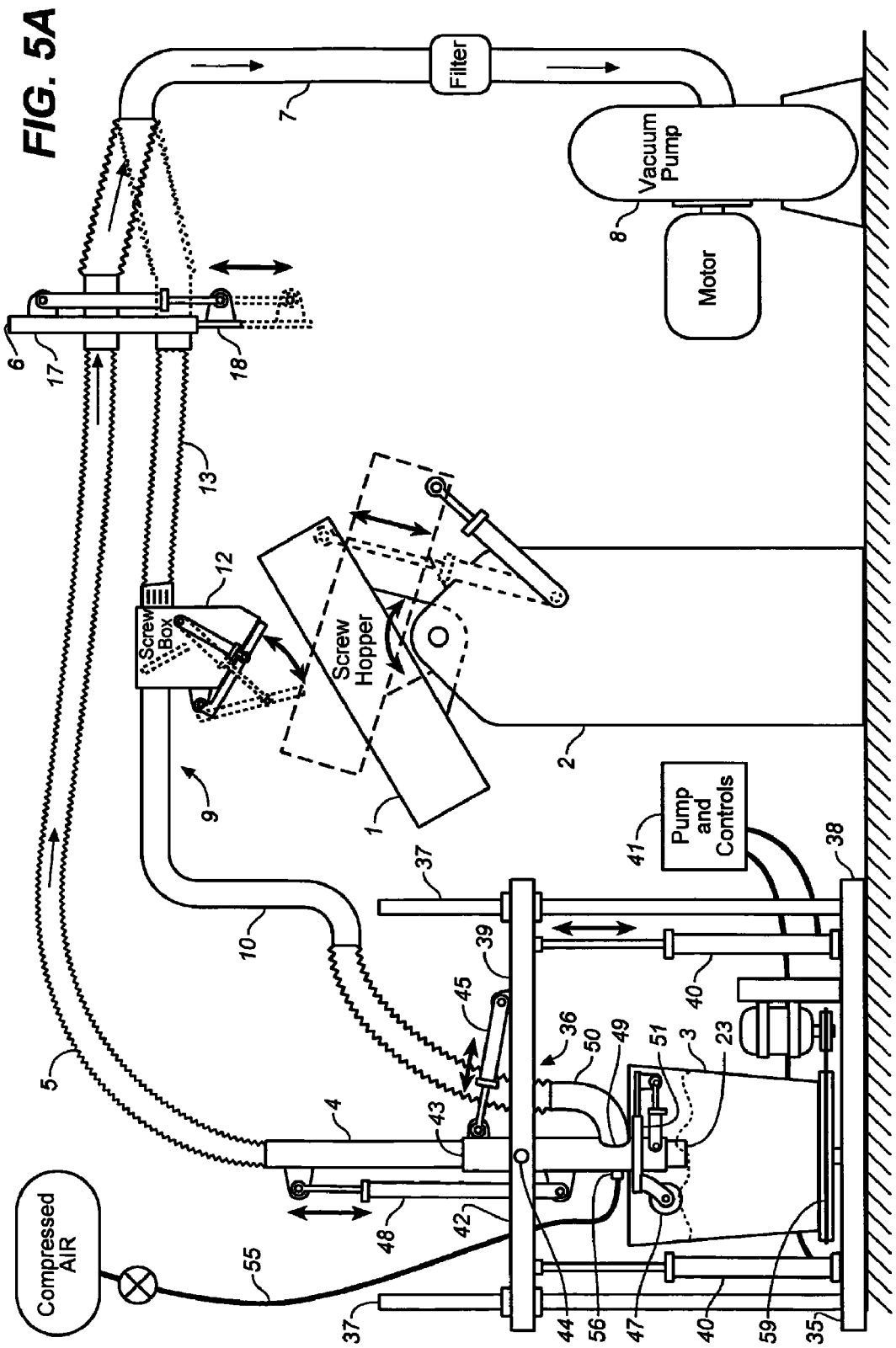
FIG. 5A is a schematic side view of a system, for a second more fully automatic embodiment of this invention, illustrating the various components of the embodiment and their organization and showing the charge collection and transporting implement in a first operational phase.
Figure 5B:
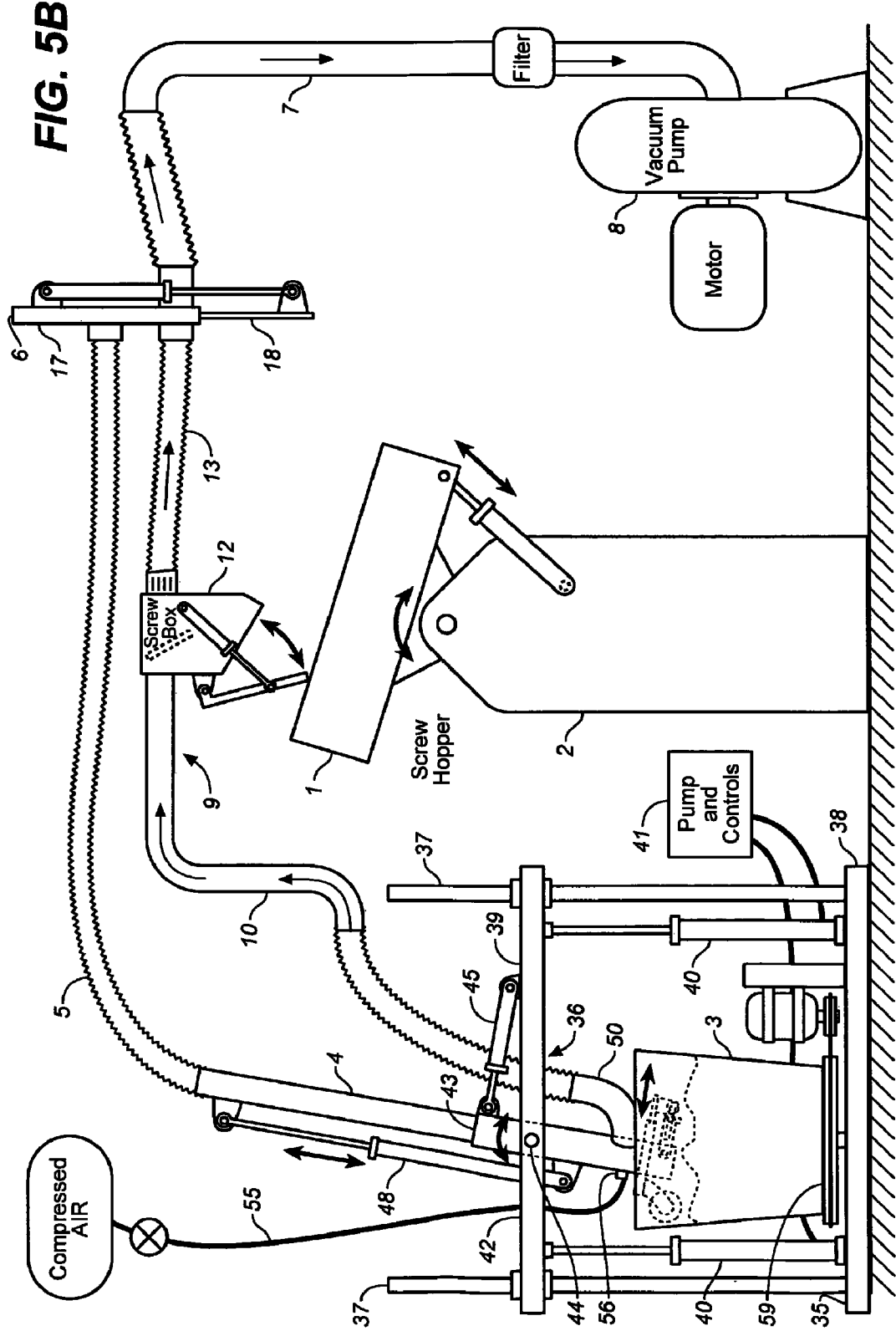
FIG. 5B is the same schematic side view as FIG. 5A but showing the charge collection and transporting implement in a second operational phase.

Looking first at FIGS. 5A and 5B, the apparatus for manipulating the implement and for pneumatically transporting the charge is designated generally by arrow A and comprises a stand 35 that bears a carriage 36 for the manipulating and transporting apparatus as will be described. Guideposts 37 extend vertically from base 38 of stand 35 that are each slidably engaged by crossbeam 39 of carriage 36 for vertical movement above base 38. A pair of opposed vertical double-acting air cylinders 40 are attached to base 38 at their lower ends and to crossbeam 39 at their upper ends for supporting crossbeam 39, together with guideposts 37, for vertical movement thereof. Cylinders 40 are together operated from a compressed air supplier through controller 41, the function of which will be described.

Crossbeam 39 has a vertical slot 42 extending therethrough along its length, central of its width. The implement and associated equipment are received through slot 42 and a tubular mounting sleeve 43 therefor is mounted on pivot 44 extending centrally through the width of crossbeam 39. A double-acting air cylinder 45 for pivoting the implement about its vertical axis, for a distance from the vertical, is secured at one at one end to crossbeam 39 and at the other end to sleeve 43 at a position above pivot 44. Cylinder 45 is equipped with a compressed air line timer valve that can be set to activate the piston to pivot the implement from a vertical position to move the lower end of the implement a distance toward an edge of the base and then active the piston to move the implement back to the vertical.

A support wheel 47 fixed to the outside of sleeve 43 is located at the lower end of implement 4 to serve to partially support carriage 36 when it is dropped onto the surface of a mass of screws, as will be discussed.

Implement 4 fits slidably within and is carried by sleeve 43 with mouth 23 facing downward. Double-acting air cylinder 48 attached at the lower end to sleeve 43 is secured at its upper end to implement 4 at the upper end portion thereof that extends above sleeve 43. Cylinder 48 may be operated to move between a lower screw collecting position and an upper charge dropping position.

Figure 6A:
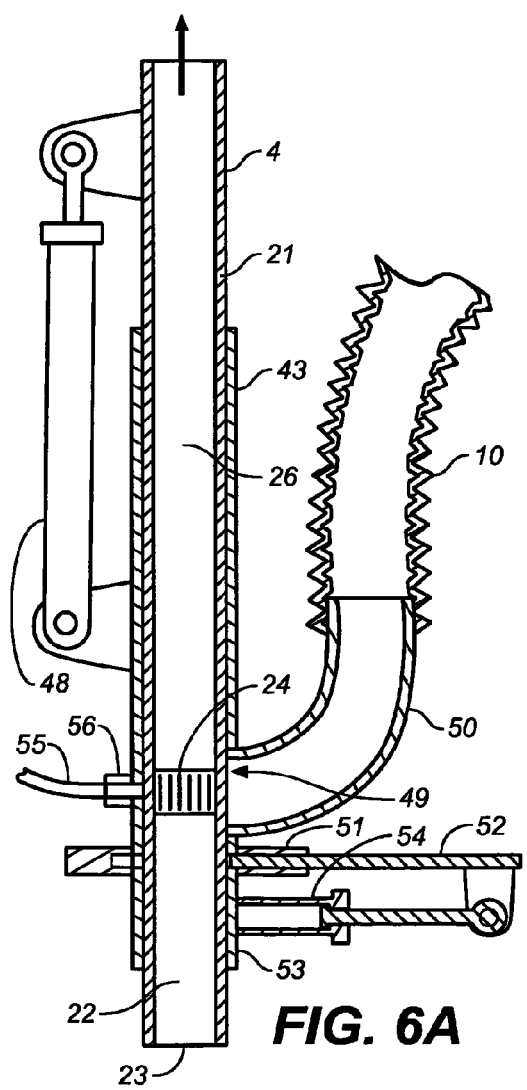
FIG. 6A is an enlarged fragmentary sectional view through the implement, implement sleeve and associated gooseneck fitting in FIGS. 5A and 5B and showing the implement in an extended position through the sleeve.
Figure 6B:
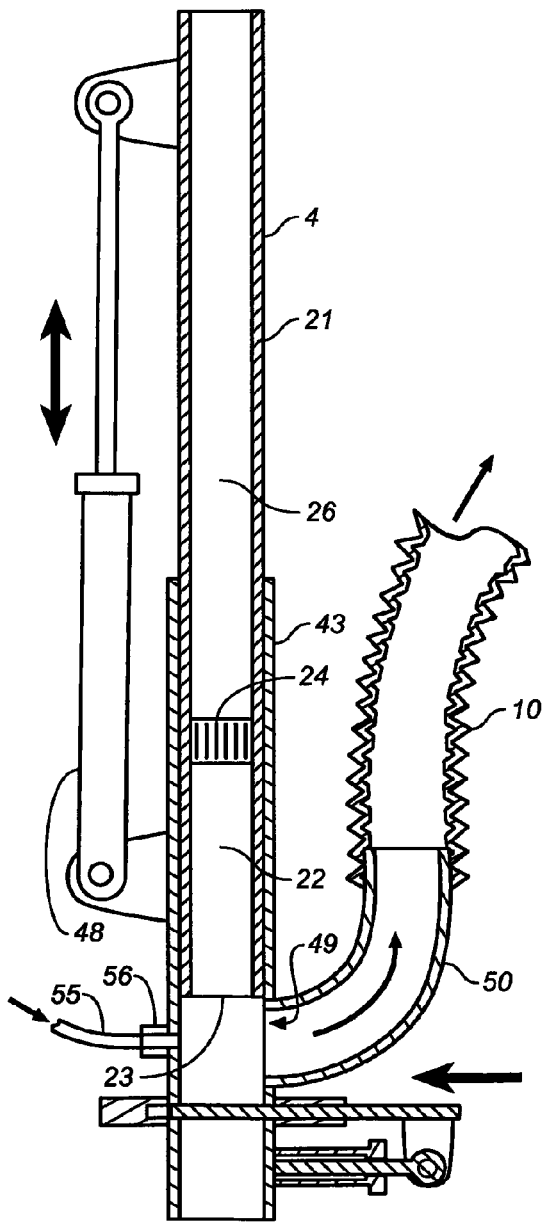
FIG. 6B is an enlarged fragmentary sectional view through the implement, implement sleeve and associated gooseneck fitting in FIGS. 5A and 5B and showing the implement a retracted position in the sleeve.

Now, referring additionally to FIGS. 6A and 6B, sleeve 43 has a port 49 attached to which a gooseneck fitting 50 is fitted. In turn, the other end of gooseneck fitting 50 is attached at the other end to charge conduit 10 and thus connecting conduit 10 with the interior of sleeve 43. On sleeve 43 just below port 49 is a slide closure 51 that has a slide plate 52 that slides between an open position at the exterior of sleeve 43 and a closed position at which plate 52 extend into and across sleeve 43 through a slot therein to close off sleeve 43 below port 49. A housing 53 for closure 51 is fitted around sleeve 43 and plate 52 to seal of the sleeve and the closure from the outside. An air cylinder 54 for operating slide plate 52 is attached to sleeve 43 and at the other end to slide plate 52. A compress air line 55 is connected through port 56 into sleeve 43 across from port 49 for assisting transport of the screw charge, as will be described.

When slide plate 52 is in the retracted or closed position, implement 4 may be operated by cylinder 48 to the screw collecting position where it extend downwardly in sleeve 43 beyond closure 51 so that the suction end of implement 4 extends downward several inches beyond the lower end of sleeve 43, as shown in FIG. 6A. When implement 4 has then received a full charge of screws, cylinder 48 may be operated to move implement 4 to the charge dropping position above port 49 and cylinder 54 actuated to move closure 51 to the closed position, as seen in FIG. 6B. This forms a pocket in sleeve 43 for receiving the screw charge that then may be dropped.

In practice, it is desirable that retracted position selected for implement 4 be a position at which mouth 23 is a sufficient distance above plate 52 to permit the screws from a charge dropping therefrom to spread apart and gain a substantial velocity before they reach the bottom of the pocket, thereby aiding the pickup of the screws in the air current and flow out of the pocket into conduit 10.

Implement 4 may optionally incorporate the collection chamber volume adjustment feature of the present, applicable to this and all of the embodiments herein. Thus, as shown in FIGS. 7A and 7B, instead of securing air permeable barrier 24 to the wall of tube 21, barrier 24 is secured across the wall of an inner tube 57 of a slightly smaller diameter than tube 21 and is slideable longitudinally within tube 21 in a telescoping relationship. The end of inner tube 57 extends a distance upward beyond the upper end of tube 21 of implement 4. Instead of being connected to the upper end of tube 21 of implement 4, vacuum hose 5 is connected to the upper end of tube 57. A hand operable set screw 58 is mounted at the exterior of tube 21 that penetrates through the wall of tube 21 so that it may be screwed inward to abut tube 57 to secure it at a desired longitudinal location along tube 21 as seen in FIG. 7A. To adjust the length, and thus the volume, of chamber 22, the set screw is screwed out and inner tube 57 slide to the desired and the set screw reset, as shown in FIG. 7B. An alternative mode of securing inner tube 57 in place is to provide screw threads at the outside periphery of tube 57 with meshing internal thread on the inside periphery of tube 21. Then tube 57 may be screwed upward or downward to change the volume of chamber 22.

In a further alternative, barrier 24 may be left in place in tube 21 with hose 5 connected to the end of tube 21. Then an open tube 57 without a barrier can be placed in tube 21. The open tube 57 may then be slid to a position at which it extends a desired distance downward beyond mouth 23. The size of chamber 22 is thereby increased and the extending end of inner tube 21, in effect, becomes the mouth of the implement. The open inner tube 21 may be secured in place as described above or by some other convenient expedient.

Stand 35 has a container turntable 59 on base 38 centered below pivot 44 on crossbeam 39 upon which container 3 rests for rotation of container 3 during collection of screws by implement 4. The length and stroke of cylinders 41 are selected so that there operation carriage 36 can move in a vertical range from a position, when of implement 4 at the extended position, where mouth 23 is at the top of container 3 to a position where mouth 23 is at the bottom of container 3.

Controller 41 for air cylinders 40 is for control of the vertical positioning of carriage 36. More specifically, controller 41 is for maintaining mouth 23 of implement 4 at the surface of the screw mass as screw charges are removed therefrom by implement 4, causing the surface level of the mass to gradually recede.

Figure 8A:
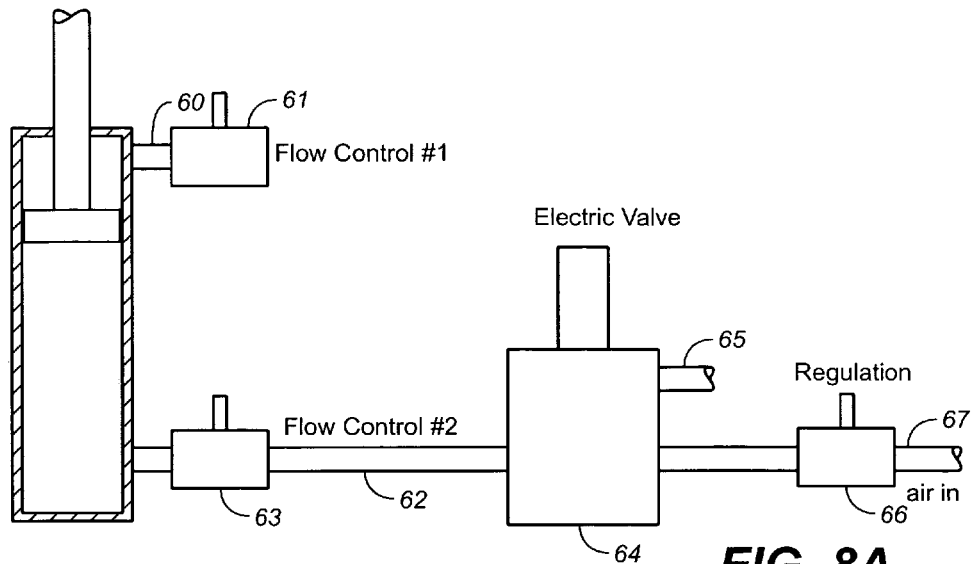
FIG. 8A is a fragmentary enlarged view of a carriage support cylinder in FIGS. 5A and 5B and a schematic of the controller shown in outline in FIGS. 5A and 5B and showing the cylinder piston in the extended position.
Figure 8B:
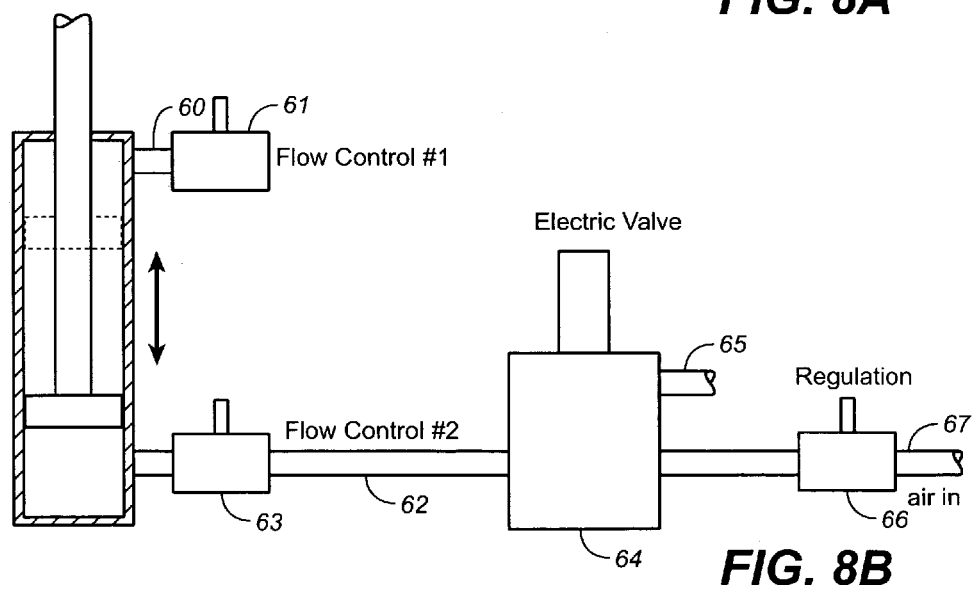
FIG. 8B is a the same fragmentary sectional view as in FIG. 8A and showing the cylinder piston in the retracted position.
Figure 9:
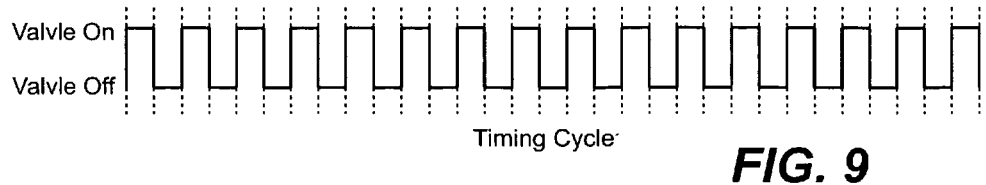
FIG. 9 is a chart showing a plot of the open-close operation of the electronically operate valve in the air input line of the controller shown in FIGS. 8A and 8B.

As seen in the schematic drawings FIGS. 8A and 8B, controller 41 comprises two controlling pressure conduits, line 60 shown communicating with the air chamber of a cylinder 40 close to the upper end thereof and above the reach of the stroke of the double acting piston 40A. The second conduit, line 62, is shown communicating with the air chamber of a cylinder 40 close to the bottom end thereof and below the reach of the downward stroke of the double acting piston.

To simplify this schematic, lines 60 and 62 are shown each directly extending from a single cylinder. In practice each of the two cylinders has a conduit line 60 and a line 62 and the two lines 60 and the two lines 62 are joined together at a respective T to form common lines 60 and 62, as shown in the schematic. Thus, in the schematic drawing of controller 41 just the common lines 60 and 62 that extend from the respective Ts that are not shown. Common line 60 extends to control valve 61. Control valve 61 is a check valve that permits free passage to the atmosphere of air from common line 60 that flows from the chamber portion of each cylinder 40 above its respective piston. Flow in the other direction through valve 61, from the atmosphere into common line 60, is restricted and the valve is adjustable by the operator to vary the extent of restriction. Thus flow into the respective cylinder above its respective piston may be restricted by valve 61 by a selectable amount through adjustment of the valve setting.

Common line 62 extends from the T (not shown) through control valve 63 to three-way valve 64. Valve 63 is a check valve that permits free passage of compressed air coming from three-way valve 64 to the chamber portion of each cylinder 40 below its respective piston. Flow in the other direction through valve 63, toward three-way valve 64 is restricted and valve 63 is adjustable by the operator to vary the extent of restriction. In this manner flow into each cylinder below its respective piston may be restricted by valve 63 by a selectable amount through adjustment of the valve setting. Thus, valve 63 serves the same function as valve 63 dampening the fall of the pistons and thus of the carriage.

Valve 64 connects common line 62, alternatively, with line 65, which vents to the atmosphere, and with a continuation of common line 62 through pressure regulator 66 to a compressed air source 67. Pressure regulator 66 is adjustable by the operator to set the air pressure of air sent into cylinders 40 below their respective cylinders. Three-way valve 64 has an automatic actuator on an adjustable electronic timer so that valve 64 may oscillate between connection of cylinders 40 with line 65 to the atmosphere and with the common line to compressed air source 67, preferably with the same dwell time at each connection, as shown graphically in FIG. 9.

In the specific embodiment here described a duration of time at each connection of about one second for the described embodiment has been satisfactory. Pressure regulator 66 is desirably set to impart an upward force via cylinders 40 on carriage 36 slightly greater than the weight of carriage 36, enough greater to cause carriage 36 to rise at a moderate rate. In the present embodiment 30 psi pressure set by regulator 66 has been satisfactory. The amount of constriction or throttle of valves 61 and/or 63 is adjusted so that the fall of carriage 36 by gravity when valve 64 is not connected with the compressed air source 67 is slowed and cushioned thereby but so the rate of fall is still slightly faster than the rate of rise when valve 64 is connected with air source 67. As so adjusted the controller will cause carriage 36 to oscillate up and down, as set in this embodiment, about an inch either way. Because the resulting force each time for the downward movement is slightly greater than that for upward movement of carriage 36, the overall movement will tend to track downward with the level of the screw mass as it is depleted by removal of charges. At each downward stroke, mouth 23 of implement 4 will impact on the surface of the mass sufficiently to immerse mouth 23 slightly below the surface, but the force will not so great as to bury the forward end of implement 4 deeply or to compact the mass unduly. Support wheel 47 helps in this respect, being positioned vertically with respect to the downward end of sleeve 43 of carriage 36 so that the wheel begins to provided support by pressing against the screw mass when the forward end of implement 4, when in the extended position is just below the surface of the mass.

In operation of the embodiment of FIG. 5A through FIG. 9, following making of the foregoing adjustments and settings, container 3 is filled with a mass of screws and with carriage extending down into the container and positioned to place mouth 23 of implement 4 to the surface of the mass. Three-way valve 64 is actuated to begin the up-down oscillation of carriage 36. Turntable 57 is started to rotate container 3 and the timing valve for cylinder 45 to cause it to oscillate the lower end of implement 4 from the center of container 3 to and edge thereof and back again. Valve 6 is brought to the position to connect pump conduit 7 with implement hose 5 to cause airflow into implement 4.

With the mouth 23 of implement 4 penetrating the mass surface during oscillation thereof and the relative movement laterally of mouth 23 and the mass surface, caused by both the container rotation on turntable 57 and the reciprocation of mouth 23 between the center and edge of the container, the screws at the surface become mobilized. The airflow into mouth 23 entrains the mobilized screws to fill move into and fill chamber 22. Barrier 24 prevents the screws from moving into back chamber 26 and into hose 5.

When chamber 22 is completely full, cylinder 43 is actuated to raise implement 4 to the retracted position as shown in FIG. 7B and cylinder 54 is actuated to close slide closure 52, also as shown in FIG. 7B. Valve 6 is then actuated to connect pump conduit 7 with conduit 10 to charge feeder 12 and to open hose 5 to the atmosphere to release the vacuum in implement 4. At the same time compressed air line 55 is opened to inject air into the compartment thus formed below mouth 23. Consequently, the screw charge falls into the compartment through mouth 23 and airflow from the injected air and the vacuum in conduit 10 entrains the falling screws to flow to charge feeder 12. The apparatus and procedure for transfer of the screw charge transferred to charge feeder 12 is identical to that of the previous embodiment of FIGS. 1A through 4F. The compartment formed in casing 43, cooperating with vacuum hose 5 and charge feeder 12 thus constitutes and functions as a receptacle for the charge dropped from implement 4.

Figure 10:
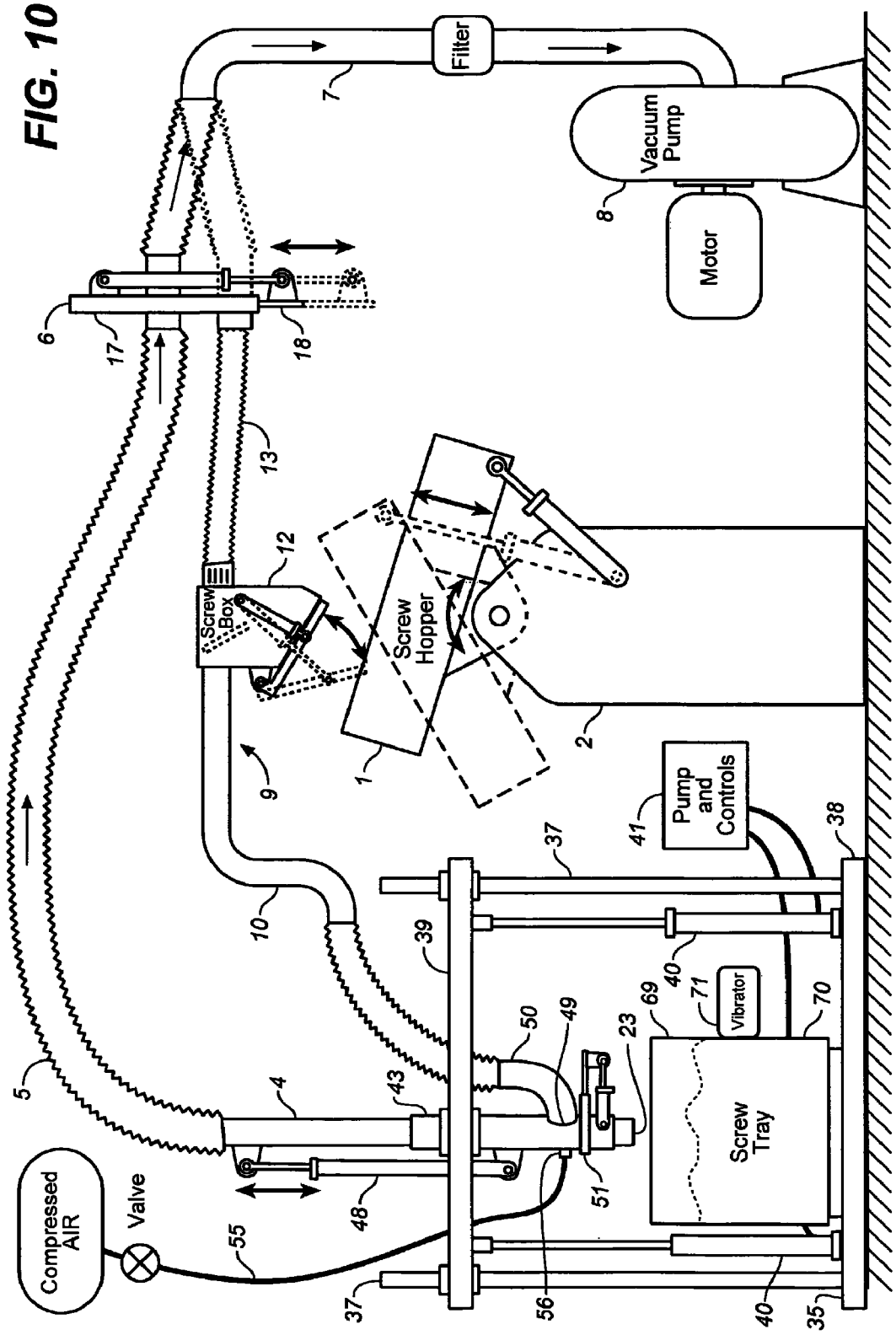
FIG. 10 is a schematic side view of a system, for a third embodiment and preferred embodiment of this invention that is more fully automated, illustrating the various components of the embodiment and their organization.
Figure 11:
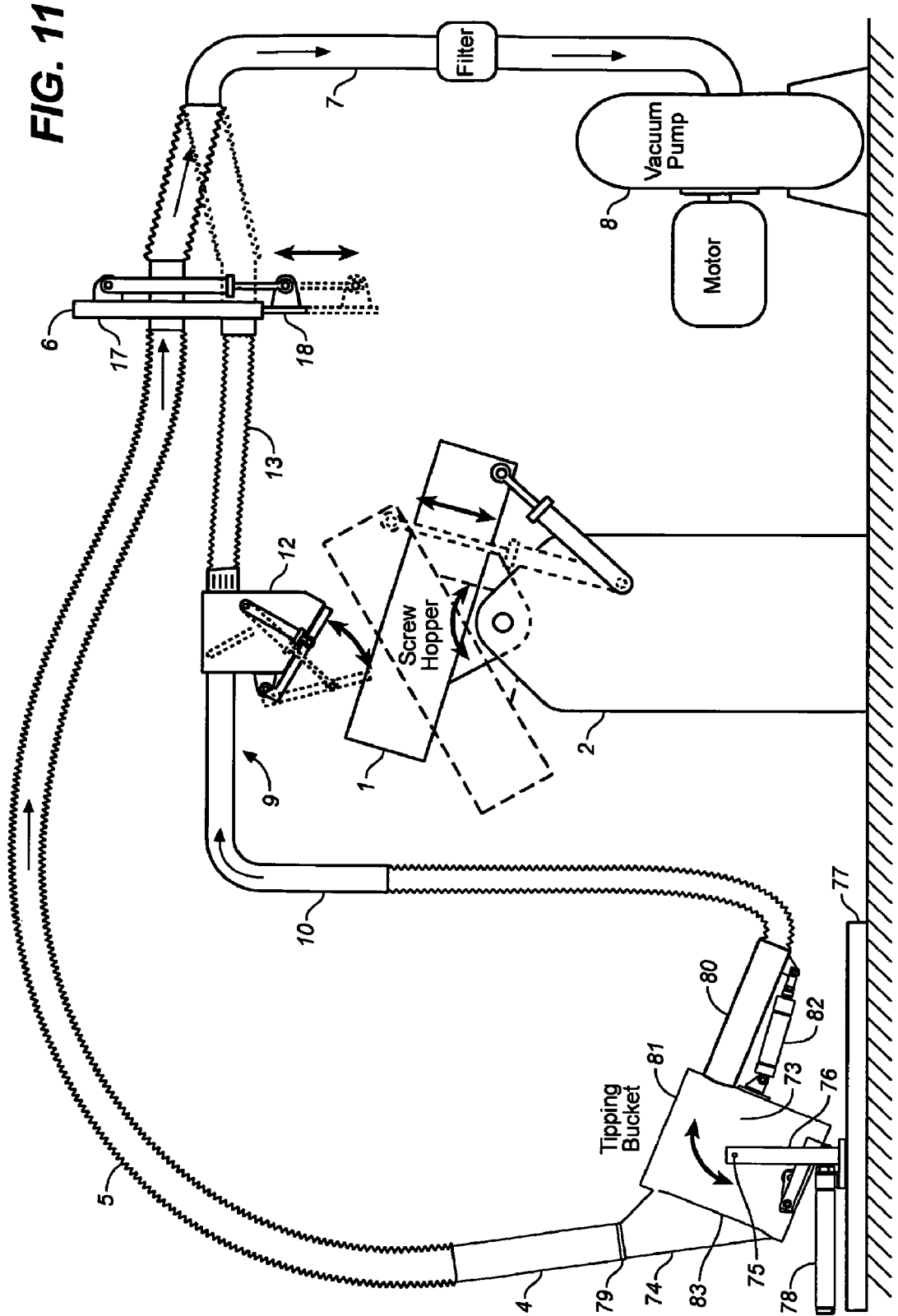
FIG. 11 is a schematic side view of a system, for a fourth embodiment of this invention illustrating the various components of the embodiment and their organization

The third embodiment of the invention, shown in FIG. 10, illustrates another mode of mobilizing the articles and is the currently preferred mode for a more fully automated procedure. As in the next preceding example, apparatus is provided for receiving and pneumatically transporting to the ultimate destination the charge dropped from the implement. In this embodiment the implement, charge drop, pneumatic plumbing, valve and vacuum generator have essentially the same construction as in the preceding embodiment so the reference numbers in the drawings for these items remain the same as for the first two embodiments. Additionally, implement 4 is essentially identical that in the previous embodiment of FIGS. 5A through 9, as is stand associated structure for supporting and manipulating carriage 36 and implement 4, except that implement 4 is supported on crossbeam 39 in a fixed vertical position and thus there is no cylinder for rotating implement 4 about its vertical axis.

Base 38 bears no turntable. Instead a vibratory container unit 69 is located on base 3 having an open top vessel 70 centered below implement 4. Unit 69 is operably attached to vibratory drive 71. Vessel 70 may take various configurations. While rectangular containers may be employed, circular containers are considered the most efficient for this embodiment as will be discussed. Many such units, used for a variety of purposes for finishing and deburring articles, particularly machined parts such as screws. They are available from many manufacturers. Suitable units include Mr. Deburr Vibratory Finishing Machines and Burr King Manufacturing Co. For a bowl type machine Burr King product item 20000-1, with a diameter of 17 inches and a depth of 6½ inches is suitable. For their intended use in deburring, abrasive blocks or the like are typically placed in the container to abrade the articles being debarred. Of course, in the use if such machines in the present invention no such abrasive elements are used.

In operation of this embodiment a mass of screws is placed in vessel 70, implement 4 is brought to the extended position and the carriage height adjusted to bring the carriage down from the idle position above the container shown in FIG. 10 to a position with mouth 23 of implement 4 at surface of the mass. The oscillating mechanisms for carriage 36 are adjusted as described for the last embodiment and the oscillation commenced. Valve 6 is adjusted to bring hose 5 into communication with vacuum pump conduit 7 and pump 8 is activated. At the same time vibratory unit 69 is activated.

This will cause the surface screws to become mobilized and picked up in mouth 23 by the vacuum imparted implement 4. When chamber 22 has been filled, implement 4 is brought to the retracted position and transfer of the charge to conduit 10, then to charge feeder 12 and from there to hopper 1 proceeds as described for the embodiment of FIGS. 5A though 9.

A fourth embodiment of the invention, as illustrated in FIGS. 11 through 14C, utilizes yet another mode for mobilizing the articles at the top of a mass to be picked up and transported. In this embodiment, the mass of articles is manipulated to tip the surface of the mass downward in a collection direction from the horizontal in a manner to obtain a controlled mobilization and flow of the surface articles in the mass in the collection direction into the mouth of the vacuum implement of this invention stationed near the surface toward the edge of the mass. Advantageously, a pneumatic transporter of this invention is integrated with the container and implement as will be described.

The present embodiment includes elements common with the preceding embodiments of the invention, including the implement, charge drop, pneumatic plumbing valve and vacuum generator which have essentially the same construction so the reference numbers in the drawings for these items remain the same as for the previous embodiments. Additionally, implement 4 is essentially identical that in the previous embodiments.

For the present embodiment a generally cylindrical container 73 is provided that has a spout 74 at one side thereof and a pivot axle 75 that extends outwardly from either side of container 73 midway between the top and bottom thereof on an axis transverse to the radial direction of spout 74 from the vertical axis of container 73. Upright arms 76 extend from a base 77 upward to support journalled bearings for axle 75. Air cylinder 78 pivotally connecting base 77 the bottom of container 73 is positioned for pivoting container 73 about the axle axis a distance in both directions from the vertical (position where the principal axis of the container is at the vertical).

Mouth 23 of implement 3 in this embodiment has a slide fit connection with the mouth 79 of container spout 74, the mouth end of implement 4 nesting and being removably supported by mouth 79. Container 73 connects with charge conduit 10 at the opposite side from spout 74 by a conduit end section 80 slidably extending through the container sidewall 81. Air cylinder 82 attaches to sidewall 81 at one end and to end section 80 at the other and operates to slide end section between two positions as will be explained.

The entrance to spout 74 is large, deep and generally of a funnel or trough shape and gradually decreases to the mouth 79 in cross-sectional area transverse to direction from the mouth 79 and the central axis of container 73. Spout 74 thus extends outwardly from sidewall 81 about a vertical slot 83 in sidewall 81 that extends almost the full vertical length of container 73. From the bottom of slot 83 to the spout mouth 79 the lower side or edge 84 of spout 74 extends in a straight line gradually and increasingly outwardly from the principal axis of container 73. The upper side or edge 85 of spout 74 extends at an upward angle from the top of slot 82 to spout mouth 79. The sides 86 extend outwardly from the vertical edges of slot 83 generally parallel to each other. This configuration of the spout tends to channel the flow of screws to the implement in a gradually decreasing cross-section to promote flow without plugging of the channel and the vertical configuration of the spout entrance, as with slot 83 helps to similarly enhance the flow over a vertical range of location of the screw mass surface as the mass volume recedes with the removal of multiple charges.

Figure 12:
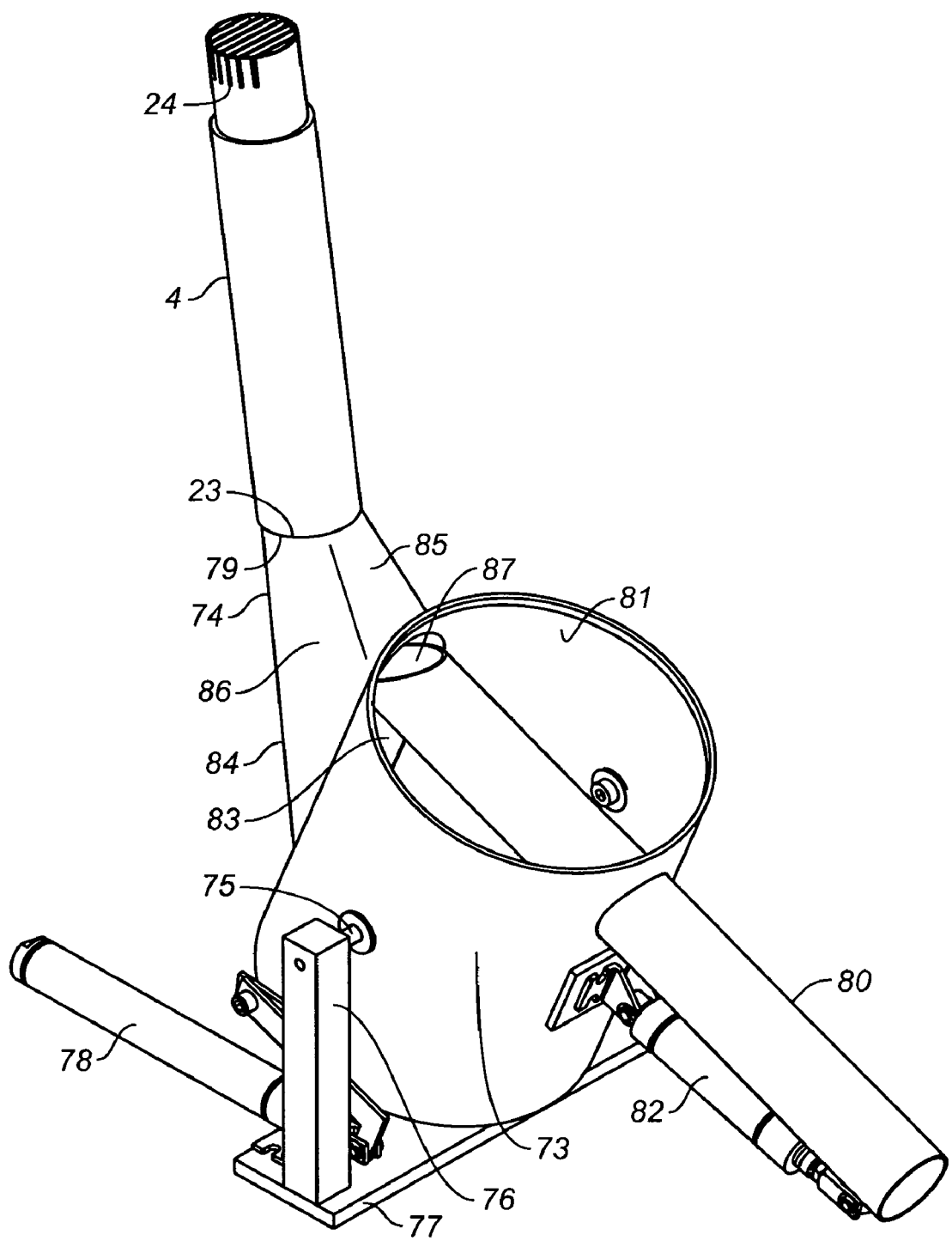
FIG. 12 is an enlarged, isometric view, in isolation, of the article charge collection apparatus and the primary charge-receiving receptacle, the inlet section of the conduit of the pneumatic conveying system, shown in FIG. 11.
Figure 13:
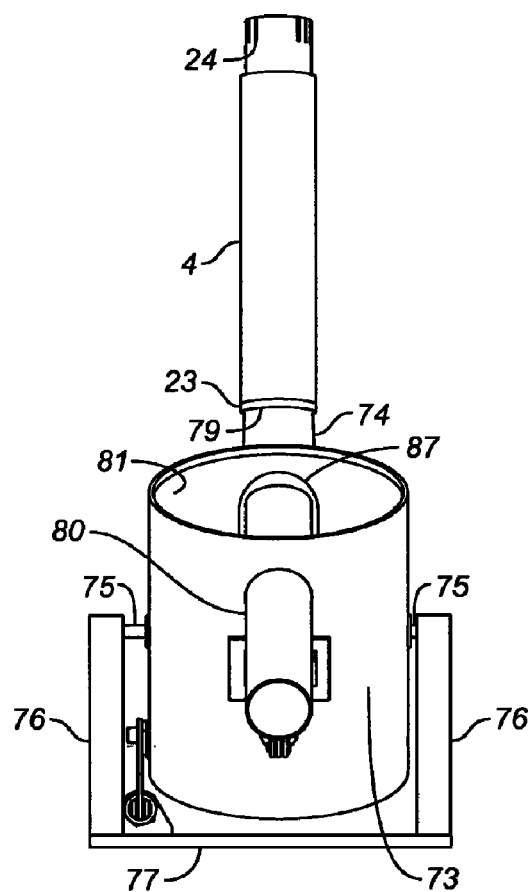
FIG. 13 is an enlarged back view, in isolation, of the article charge collection apparatus and the primary charge-receiving receptacle shown in FIGS. 11 and 12.
Figure 14A:
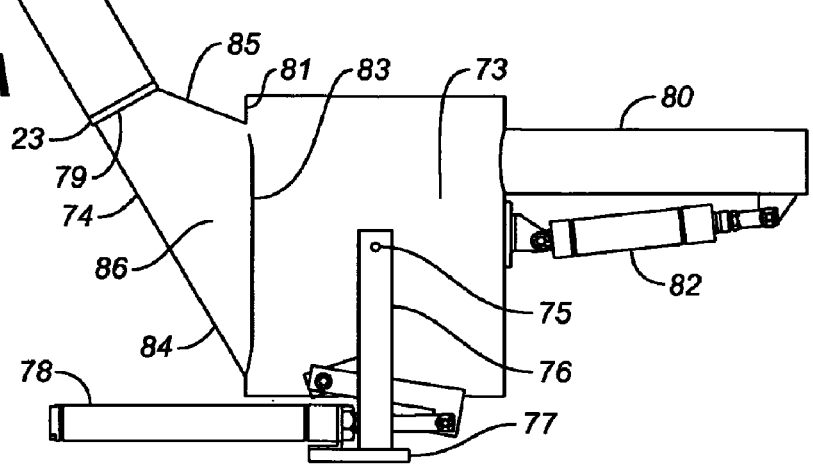
FIG. 14A is an enlarged side view, in isolation, of the article charge collection apparatus and the primary charge-receiving receptacle shown in FIGS. 11 through 13, shown in an upright orientation with the container principal at the vertical.
Figure 14B:
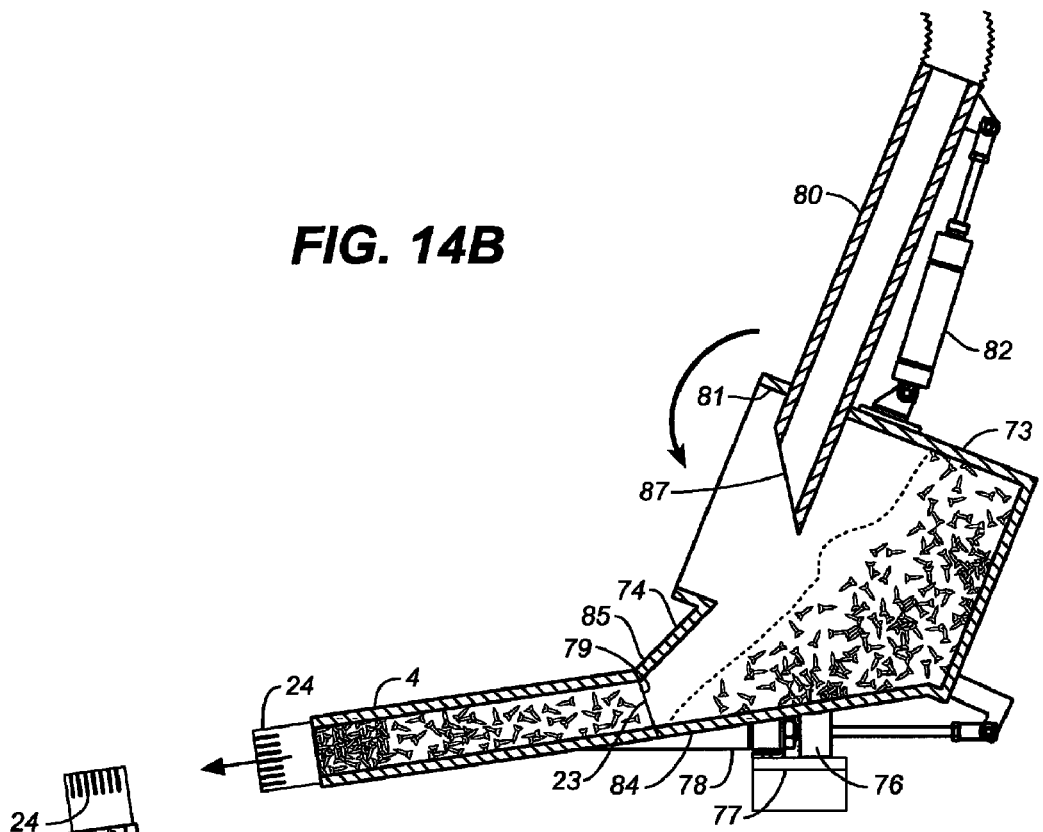
FIG. 14B is an enlarged side view, in isolation, of the article charge collection apparatus and the primary charge-receiving receptacle as in FIG. 14A but shown in an a charge collection orientation with the container at the charge-collection position, tipped downward in the direction in of the container spout.
Figure 14C:
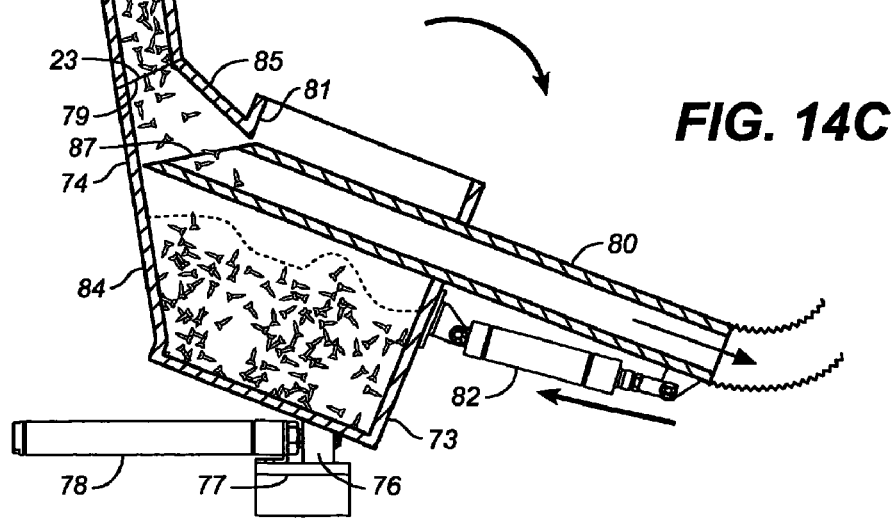
FIG. 14C is an enlarged side view, in isolation, of the article charge collection apparatus and the primary charge-receiving receptacle as in FIGS. 14A and 14B but shown with the container at the charge-drop position, tipped slightly downward in the direction away from the container spout.

Looking particularly at FIGS. 12, 14B and 14C, conduit end section 80 extends through an opening in sidewall 81 in a slide fit, into the interior of container 73 and may be positioned therein to serve as an inlet for charge conduit 10. In a retracted position, as shown in FIG. 14B, mouth 87 of conduit end section 80 is retracted to a position close to sidewall 81 opposite from spout 74 at which conduit end section 80 will not interfere with the charging of implement 4 with screws. By operation of air cylinder 82, conduit section 80 is moved to an engaged position, as shown in FIG. 14C at which mouth 87 is immediately adjacent and confronting and reaching into the spout opening at a position along its length toward mouth 79. Mouth 87 is configured so that, with conduit section at the engaged position and container 73 at a near vertical position, mouth 87 is generally below the spout opening and closing off the gap between mouth 87 and the wall of spout 74 sufficiently to form a receptacle such that an entire charge of screws dropped from implement 4 will be guided in to end section 80 without any screws escaping into the body of container 73.

Container 73 is oriented with its principal axis at a near vertical angle tipped about 15 degrees in the direction away from spout 74, as shown in FIG. 14C when the rod of cylinder 82 is extended. When cylinder 82 is retracted, container 73 is oriented with its principal axis tipped at a substantial angle from the vertical in the direction of spout 74, as shown in FIG. 14B. The angle downward toward spout 74 to which is tilted is selected so that the mass of screws in container 73 retains its integrity. If tipped too far the portions of the mass can cascade into the spout and plug it up. Angled properly, only the surface screws will be loosened and, under the influence of gravity and the air currents created by the vacuum in implement 4, they will become entrained and in a loose flow move into and through spout 73 into mouth 23 of implement 4.

In operation of the embodiment of FIGS. 11 through 14C container 73 is first filled with a mass of screws, as seen in FIG. 9A, and cylinder is activated to tilt container 73 downward in the direction of spout 74 as shown in FIG. 14B. At the same time valve 6 is operated to connect hose 5 with vacuum supply conduit 13. The combination of gravity and airflow toward the implement will cause the surface screws of the mass to flow into implement 4. When chamber 22 has received a full charge, cylinder 78 is operated to bring container 73 to the near position, cylinder 82 is then operated to bring conduit end section 80 to the engaged position, both as shown in, and valve 6 is actuated to connect hose 10 with vacuum supply conduit 13. Thereupon the screw charge will begin to drop into conduit end section 80, as shown in FIG. 14C, and the charge transported by the air currents set up by the vacuum in conduit 10 to charge 12 for feeding into hopper 1 as in the prior embodiments.

Figure 15:
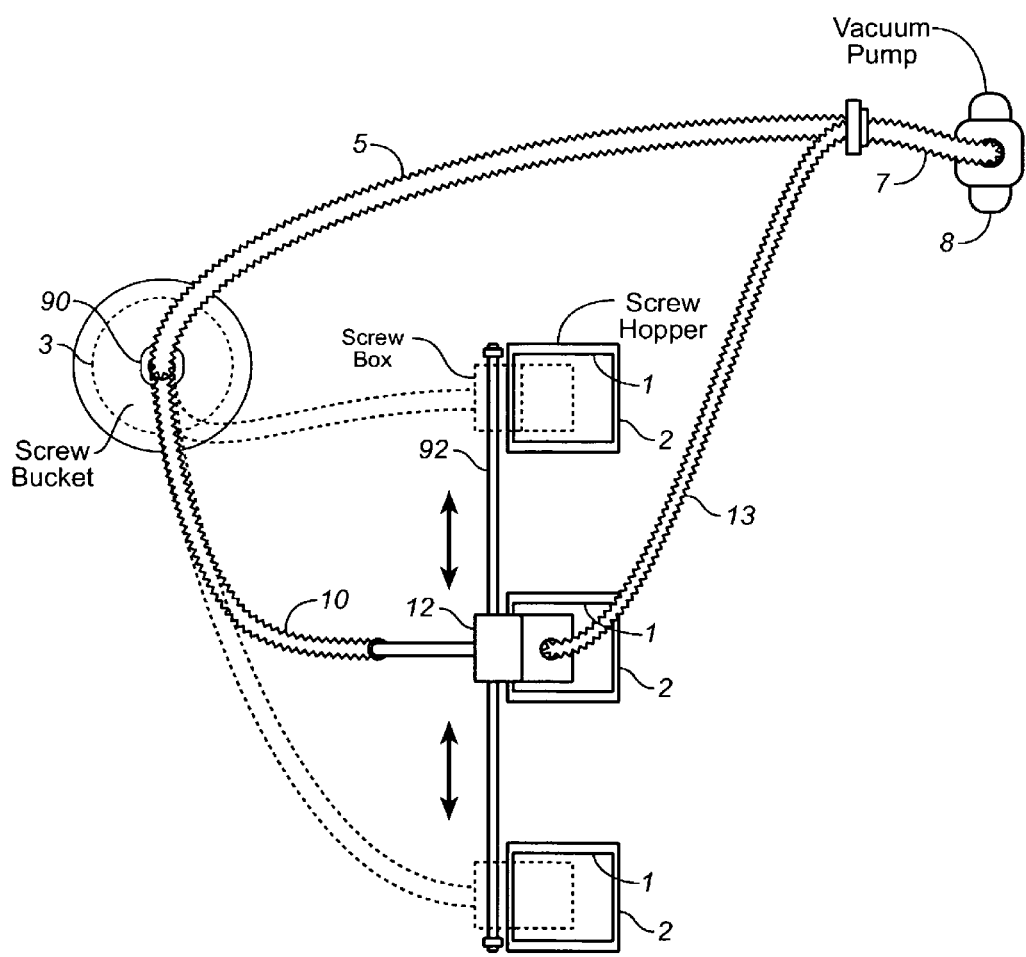
FIG. 15 is a schematic overhead view of an embodiment of the invention for supplying charges of articles to a multiplicity of secondary or ultimate receptacles, in which the secondary receptacles are stationary and the charge feeder changes positions.
Figure 16:
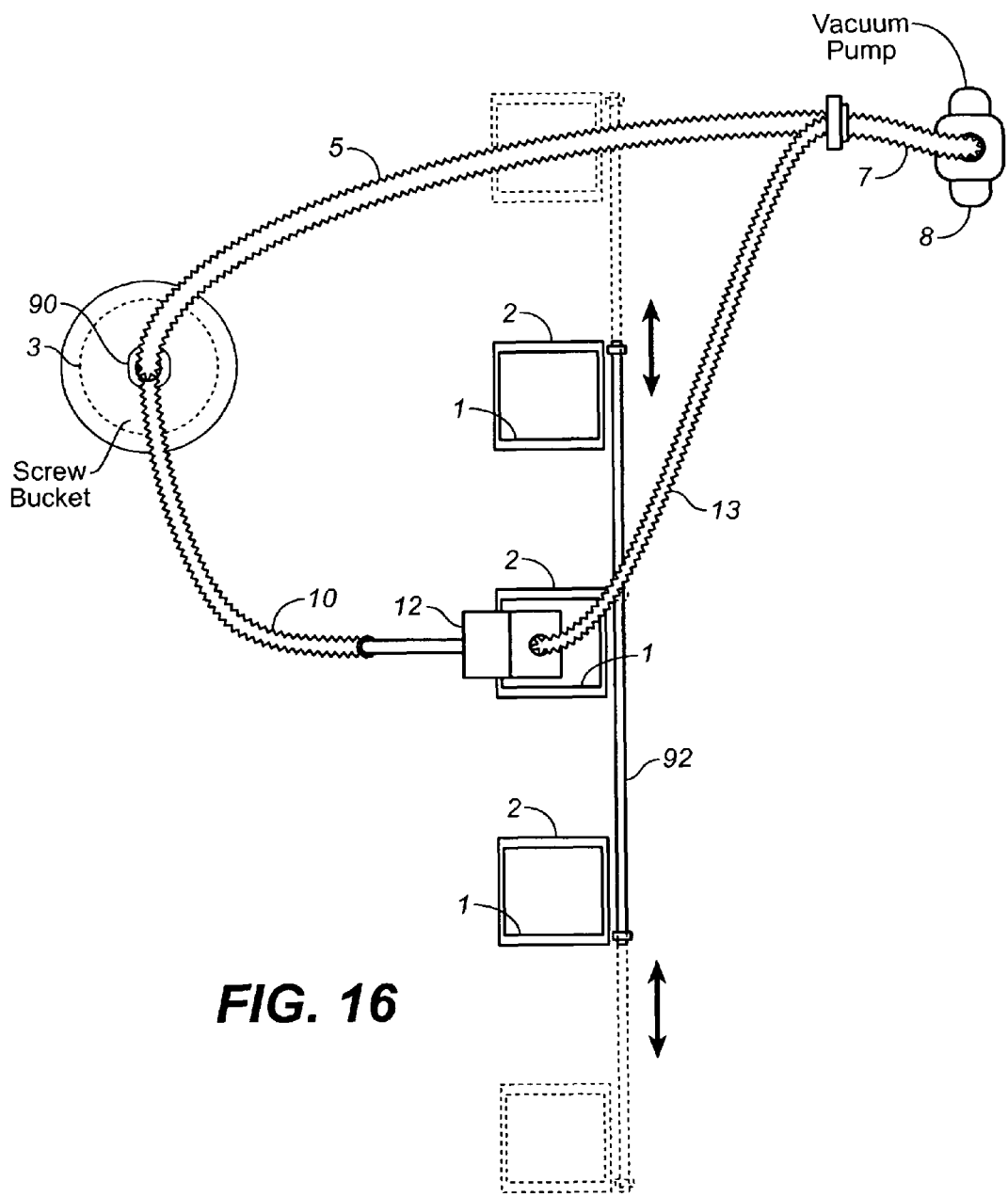
FIG. 16 is a schematic overhead view of another embodiment of the invention for supplying charges of articles to a multiplicity of secondary or ultimate receptacles, in which the charge feeder is stationary and the secondary receptacles change positions.

Other embodiments of this invention may be utilized for feeding charges of articles to a series of receivers. FIGS. 15 and 16 each describe systems for this purpose. Both employ a single pneumatic article extracting and transporting system 90 having a charge feeder 12, which may be as described in any of the preceding embodiments, for feeding charges to each of hoppers 1 for three screw feeders 2. In the system of FIG. 15, screw feeders 2 are mounted for movement along conveyer track 91 that extend on a path under charge feeder 12

In the system of FIG. 16 screw feeders 2 are permanently mounted and spaced apart in a row and charge feeder 12 is mounted for movement along conveyer track 92 that extend on a path over each of the three screw feeders 2. In this system both hose 5 and charge conduit 13 are flexible and of a length to accommodate the movement of charge feeder 12 to each of the respective screw feeders. In operation, screw feeders 2 may be moved along track 91 to bring a selected screw feeder under charge feeder 12 and system 90 and charge feeder 12 to drop a charge into the hopper 1 of screw feeder 2.

Figure 17:
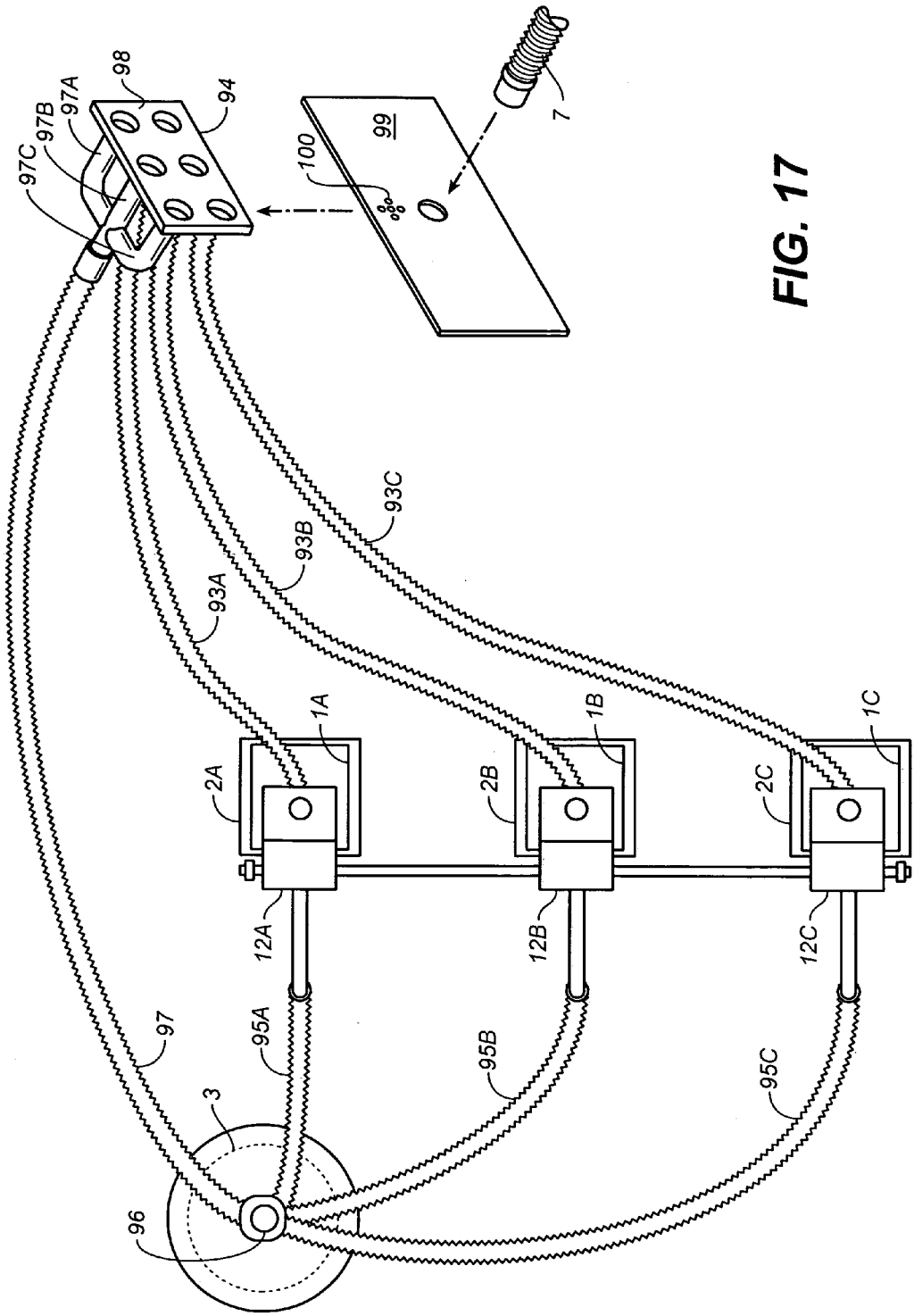
FIG. 17 is a schematic overhead view of another embodiment of the invention for supplying charges of articles to a multiplicity of secondary or ultimate receptacles, in which the secondary receptacles are stationary and which has a multiple number of stationary charge feeders, one at each secondary receptacle, this figure showing a common vacuum distribution valve in a partially expanded view.
Figure 18A:
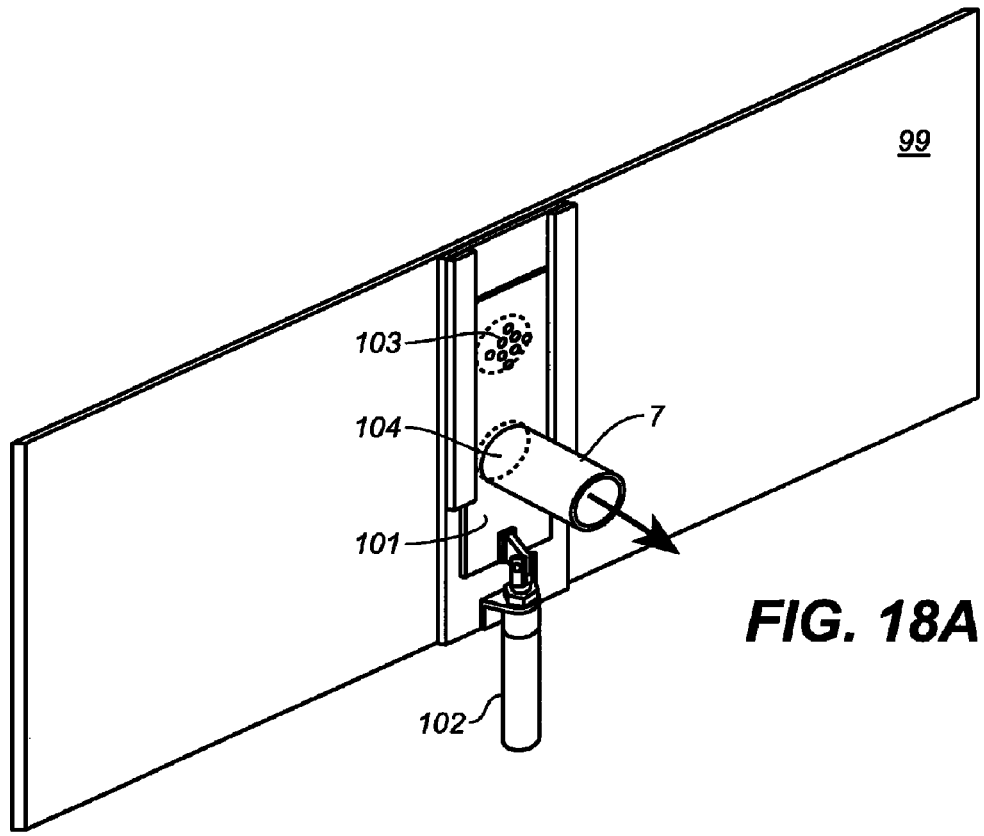
FIGS. 18A and 18B are both the same sectional view of an alternative sliding plate for the valve shown in 17 through 17F in which the sliding plate, in turn, has a plate mounted thereon for sliding vertically.
Figure 18B:
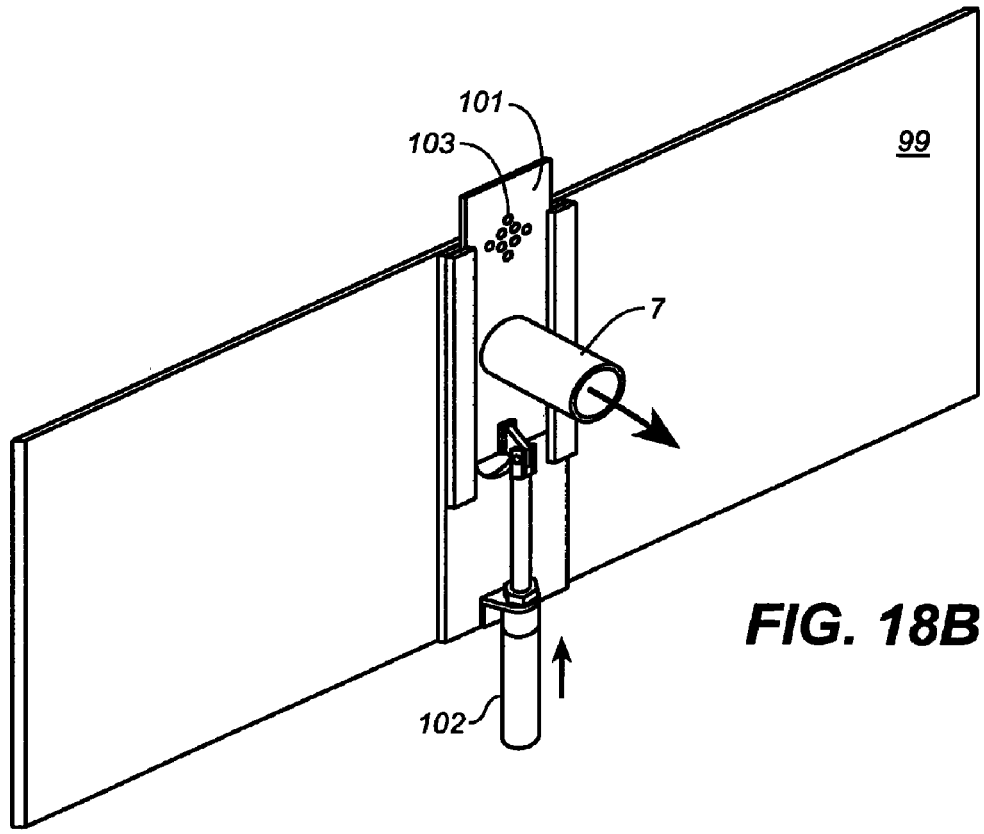

The embodiment illustrated in FIGS. 17 through 18B is another collective arrangement for separately feeding a multiple number of stationary receptacles or receivers, each utilizing the same pneumatic article extracting and transporting system. This embodiment may utilize any of the pneumatic systems described in any of the preceding embodiment. Rather than having a single charge conduit 10 to a single charge drop 12, in this example a separate stationary charge drop, 12A, 12B or 12C, respectively, is situated above each respective hopper 1A, 1B and 1C.

Each of the three charge feeders has a vacuum conduit, 93A, 93B and 93C, respectively, that extends to a common vacuum distribution valve 94 and a charge conduit, 95A, 95B and 95C, respectively, that extends to pneumatic article extracting and transporting system 96. Rather than a single port 49 with a fitting 59 described in the previous embodiments, sleeve 43 of implement 4 here has three ports at the periphery at the same level (not shown), each connected to a charge conduit 95A, 95B or 95C, respectively.

In an alternative arrangement (not shown), a single port 49 may be employed with a single charge conduit 95 leading a valve similar to valve 6, but with a stationary plate having three rather than two ports along the length thereof. In this arrangement the conduit 95 would communicate with the port on sliding plate 18 and a respective charge conduit 95A, 95B or 95C would be at a respective port in stationary plate 17. Thus, in this arrangement the interposed valve could be actuated to selectively connect the single port 49 to each of conduits 95A, 95B and 95C and its respective charge feeder, 12A, 12B or 12C Conduit or hose 97 to valve 94 connects the back chamber of the implement 4 of system 96. Adjacent valve 94 hose 97 branches into three conduit lines, 97A, 97B and 97C that each connect to a respective port in an upper row of ports in stationary plate 98 of valve 94 so that implement 4 communicates through back chamber 26 to all three upper ports in stationary plate 98.

Vacuum distribution valve 94 has a slide valve similar to valve 6 of the preceding embodiments and stationary plate 98 connects to the conduits from each extracting and transporting system 96 in the arrangement that will be described and a sliding plate 99 that connects to vacuum conduit 7 which connects at the other end to vacuum pump 8.

FIGS. 17A through 17F show the arrangement of the various conduit connections from the collecting and extracting system 96 to stationary plate 98 and the sliding plate 99 positions for connecting vacuum conduit 7 with the conduits from system 96. Branch conduits 97A, 97B and 97C are each connected to stationary plate 98, respectively, at one of three upper tier openings or ports therefor, in stationary plate 98. Similarly, vacuum conduits, 93A, 93B and 93C are each connected to stationary plate 98, respectively, at one of three lower tier openings or ports therefor, in stationary plate 98.

The connection port on sliding plate 99 for conduit 7 is toward the bottom of plate 99 from the middle, as shown. At a position immediately above the connection port for conduit 7, plate 99 has a cluster of openings 100 therethrough. Cluster 100 is positioned so that, when the port for conduit 7 is in register with one of the lower tier ports for conduits 93A, 93B and 93C, cluster 100 registers with one of the ports for conduit 97A, 97B and 97C.

Figure 17A:
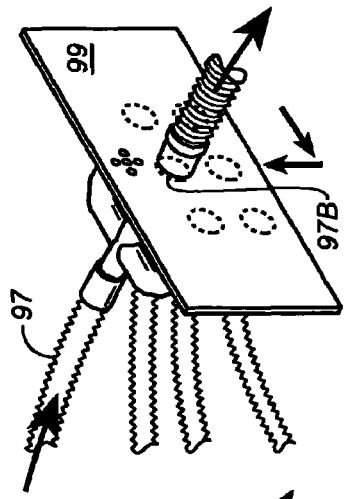
FIGS. 17A through 17F is a sectional view of the multiple conduit valve shown in FIG. 17 taken at the stationary plate side, showing the valving connection positions of the valve.
Figure 17B:
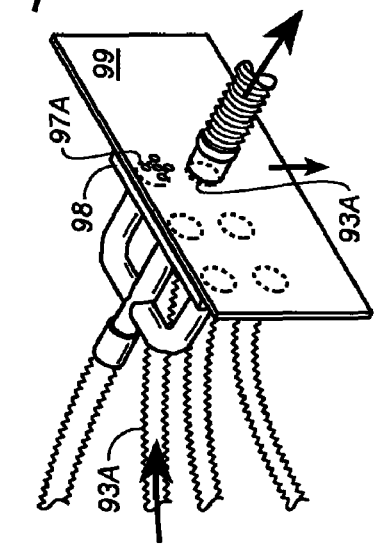
Figure 17C:
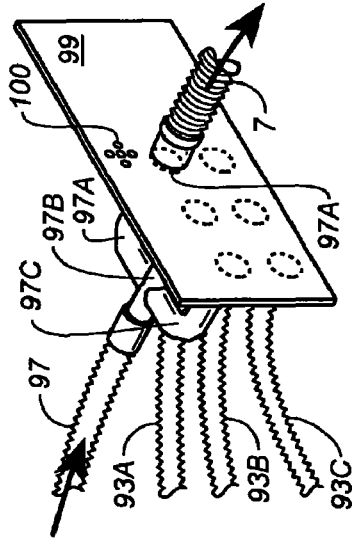
Figure 17D:
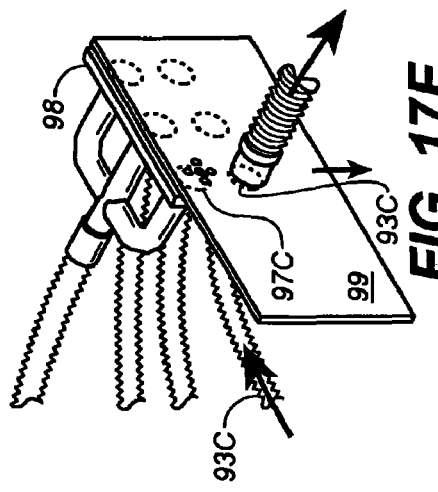
Figure 17E:
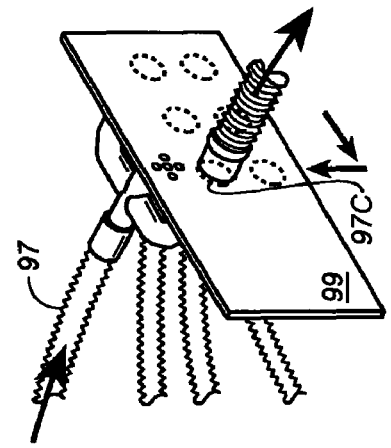
Figure 17F:
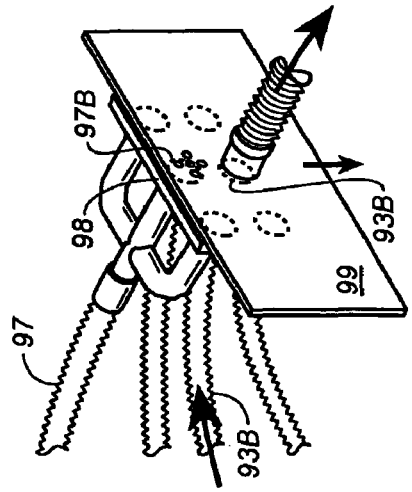

Means are provided, such as vertically and horizontally operating air cylinders attached to the plates (not shown), to operate the valves. A horizontal cylinder or the like moves sliding plate 99 between three horizontal positions. The first position, as shown in FIG. 17A, conduit 7 communicates with conduit 97A to impart vacuum flow to the implement of system 96. A vertical cylinder or the like moves sliding plate vertically, and in the second position, shown in FIG. 17B, the sliding plate remains at the same horizontal position but is moved downward so that conduit 7 communicates with conduit 93A to impart vacuum flow to the charge feeder 12. With plate 99 at this position, the hole cluster 100 registers with conduit 97A to expose conduit 97A to the atmosphere to thereby release the vacuum and thereby cause the charge collected in the implement to drop for pick up by the vacuum flow at receptacle and transport by charge conduit 95A to charge feeder 12A for feeding to hopper 1A.

To feed a charge to hopper 1B, sliding plate 99 may be then moved horizontally to the left to the second vertical pair of conduits and moved to the upward position to cause conduit 7 to now register with conduit 97B, as shown in FIG. 17C, to again impart vacuum flow to the implement. Slide plate 99 is then moved downward to the position shown in FIG. 17D to release the vacuum to the implement to drop the charge from the implement and to apply vacuum this time to conduit 95B to move the charge to charge feeder 12B.

To feed hopper 1C, slide plate may be moved left and upward and the process described for each of the two horizontal positions repeated, as illustrated in FIGS. 18E and 18F. It will be noted that, at all six positions of the valve, sliding plate 99, all of the ports of stationary plate 98 are covered by sliding plate 99 except for the ports in register with either conduit 7 or the hole cluster 100. By thus blocking the flow of air into the other ports, the vacuum condition is maintained during either collection or transport of the charges.

An alternative arrangement for sliding plate 99 of valve 94 is shown in FIGS. 18A and 18B. In this arrangement a vertically sliding plate 101 is mounted on the side of sliding plate 99 opposite the stationary plate side for vertical movement between an upper and lower position on plate 99 by action of air cylinder 102. In this version sliding plate 9 has vertically aligned upper ports 103 and 104. When plate 101 is at its upper position the port for conduit 7 registers with the port 103 and when plate 101 is at its lower position the port for conduit 7 registers with port 104.

Sliding plate 99 is mounted for sliding only horizontally along stationary plate 98 to align the port for conduit 7 on plate 101, alternatively, with each of the three vertical pair of ports in plate 98. At each of these aligned aligned port positions slide plate 101 can be moved between the upper and lower positions to register the port for conduit 7 with the adjacent upper or lower port in stationary plate 98.

The invention claimed is:

1. Apparatus for extracting and delivering articles in charges of a predetermined uniform size from a mass of the articles comprising:
   a. a vacuum implement adapted for picking up articles in charges of a predetermined size from the mass of the articles and depositing the charges at a selected location comprising a head at the forward end thereof for receiving a charge of the articles, the implement head having a mouth at a forward end thereof, an article-collecting chamber extending rearwardly from the mouth to a rearward end of the chamber, the chamber being of a size to hold a charge of the predetermined size, a vent at the rearward end of the article-collecting chamber and an air permeable barrier over the vent, the barrier having openings small enough to preclude passage through the vent of the articles,
   b. at least one vacuum generator;
   c. a conduit exterior to the implement chamber that extends from the vent of the chamber to the vacuum generator and provides air flow communication between the chamber and the vacuum generator;
   d. means for relieving the vacuum in the chamber to cause an article charge in the implement to drop from the mouth of the chamber;
   e. a receptacle at the selected location for receiving the charge, the receptacle being adapted to receive the charge dropped from the implement mouth when the implement is positioned at the selected location with the mouth above the receptacle.

2. An apparatus as in claim 1 and wherein the air-permeable barrier is rigid and the volume of the implement charge-collection chamber has a volume of between 10 and 50 cubic inches.

3. An apparatus as in claim 2 and wherein the air-permeable barrier comprises a grate.

4. An apparatus as in claim 1 and wherein at least a forward portion of the implement extending to the mouth is tubular and the thickness of the tube wall is less than one tenth of the narrowest width of the tube at the opening.

5. An apparatus as in claim 1 and wherein the implement is provided with means for adjusting the volume of the article collecting chamber to selectively increase and decrease the volume of the chamber, whereby to selectively change the size of the charge of articles collected and transported by the apparatus.

6. An apparatus as in claim 5 and wherein the means for selectively adjusting the volume of the charge-collection chamber comprises a tubular portion of the charge-collection chamber, said tubular portion having a telescoping section, whereby the length of the charge collection chamber may be selectively lengthened and shortened to change the volume of the chamber.

7. An apparatus as in claim 1 and which further comprises a container operably associated with the implement for picking up articles held in the container, the container having an opening into the interior thereof of a size and configuration to permit access of the mouth of the implement to the interior of the container and having an interior with an article mass reservoir below the opening and extending downwardly toward the bottom of the container, the reservoir of a size to hold a quantity of articles in a mass to provide a multiplicity of the charges and the container being stationed, relative to the implement, at a location where the container opening is accessible to the mouth of the implement.

8. Apparatus as in claim 1 and further comprising a container operably associated with the implement for picking up articles held in the container, the container having an opening into the interior thereof of a size and configuration to permit access of the mouth of the implement to the interior of the container and having an interior with an article mass reservoir below the opening and extending downwardly toward the bottom of the container, the reservoir of a size to hold a quantity of articles in a mass to provide a multiplicity of the charges and means associated with the container and the implement for causing agitation of articles at the upper surface of a mass of the articles held in the container reservoir to mobilize the articles at the surface for pick up by the mouth of the implement at the surface.

9. Apparatus as in claim 8 and wherein the means for causing agitation comprises means at the head of the implement for stirring articles at the upper surface of the mass in the vicinity of the mouth of the implement head and means for moving the implement head relative to the surface of the mass in a direction across the surface, whereby to cause the stirring means to agitate the surface articles for pick up by the mouth of the implement.

10. Apparatus as in claim 9 and wherein the means for moving the implement head relative to the surface of the mass comprises means for rotating the container about the container vertical axis and means for moving the appliance head between the container vertical axis and the periphery of the container and wherein the stirring means comprises a tubular forward end of the implement head extending to the mouth.

11. Apparatus as in claim 8 and wherein the means for agitating the articles comprises a vibration generator operably associated with the container to agitate the articles at the upper surface of a mass held in the interior of the container.

12. Apparatus as in claim 8 and wherein the container opening comprises a implement mouth access port toward one side of the containers, the means for agitating the articles comprises means on the container for tipping the container upward and downward in the direction of the port and means on the container for funneling the flow of articles from the reservoir to the port when the container is tipped from an upward position at which the port is above the reservoir to a downward position toward the port at which articles at the surface of a mass of articles in the reservoir may become mobilized and the container is adapted to support the implement with the mouth at the opening communicating with the container interior, whereby, when the container is tipped to the downward position from the upward position, with the implement activated to cause the fasteners at the surface of a mass of fasteners held in the container to be mobilized and flow into implement mouth and thereby charge the implement with articles.

13. An apparatus as in claim 12 and wherein the implement is detachable from the port whereby, when the container then returned to the upward position the charged implement may be detached from the opening and moved to the site of the receptacle for delivering the charge of articles.

14. An apparatus as in claim 12 and wherein the reservoir has a wall extending upward to the port and in the direction of the port the reservoir wall is in the form of a trough inclined outwardly of the container vertical axis and extending in an upward direction and tapering to the port with a gradually decreasing cross-section transverse to the upward direction to the port, to thereby form the article funneling means and the means for tipping the container comprises a pivot on the container positioned for pivoting the container about an axis perpendicular to the direction of the port from the vertical axis of the container.

15. An apparatus as in claim 12 and wherein the implement is detachable from the port of the container, whereby, the container may be pivoted downwardly, from an upright orientation toward the opening with the implement activated to cause the fasteners at the surface of a mass of fasteners held in the container to be mobilized and flow into implement mouth at the opening and the container then returned to the upright position and the charged implement detached from the opening and, moved to the site of the receptacle for delivering the charge of articles.

16. Apparatus as in claim 12 and wherein the receptacle has an opening adapted for positioning in a receiving position below the port in the interior of the container for receiving articles dropped from the implement and the apparatus further comprises means for moving the receptacle between the receiving position for receiving a charge of articles dropped from the implement mouth and a retracted position at a distance from the port at which the receptacle does not obstruct of movement of articles at the mass surface to the port, and a pneumatic charge transporter for conveying charges received by the first receptacle to a receiver at a selected site more distant from the implement, the charge transporter being in flow communication with the receptacle and comprising a charge feeder at the selected site, the feeder having a chamber, a conduit connecting the receiver e to the feeder chamber at a feeder chamber inlet, the conduit adapted to provide flow communication therebetween for air entrained articles, and a conduit connecting the vacuum generator to the feeder chamber, at a feeder chamber outlet, and adapted to provide flow communication therebetween to cause, upon activation of the vacuum generator, air flow from the receiver to the feeder chamber, whereby to entrain articles of a charge dropped into the receiver to convey the articles into the feeder chamber, the feeder chamber adapted to decrease the flow velocity of article-entrained air flow between the inlet and outlet to cause the articles to detrain from the air flow and fall to and deposit in the chamber, and having means for withdrawing from the chamber and delivering to the receiver at the selected site the deposited charge.

17. Apparatus for extracting and delivering articles in charges of a predetermined uniform size from a mass of the articles comprising:
   a. a vacuum implement adapted for picking up articles in charges of a predetermined size from the mass of the articles and depositing the charges at a selected location comprising a head at the forward end thereof for receiving a charge of the articles, the implement head having a mouth at a forward end thereof, an article-collecting chamber extending rearwardly from the mouth to a rearward end of the chamber, the chamber being of a size to hold a charge of the predetermined size, a vent at the rearward end of the article-collecting chamber and an air permeable barrier over the vent, the barrier having openings small enough to preclude passage through the vent of the articles,
   b. at least one vacuum generator;
   c. a conduit exterior to the implement chamber that extends from the vent of the chamber to the vacuum generator and provides air flow communication between the chamber and the vacuum generator;
   d. means for relieving the vacuum in the chamber to cause an article charge in the implement to drop from the mouth of the chamber;
   e. a receptacle at the selected location for receiving the charge, the receptacle being adapted to receive the charge dropped from the implement mouth when the implement is positioned at the selected location with the mouth above the receptacle;
   f. a container operably associated with the implement for picking up articles held in the container, the container having an opening into the interior thereof of a size and configuration to permit access of the mouth of the implement to the interior of the container and having an interior with an article mass reservoir below the opening and extending downwardly toward the bottom of the container, the reservoir of a size to hold a quantity of articles in a mass to provide a multiplicity of the charges;
   g. means for supporting the implement and adapted to support the implement with the head downward into the container interior with the implement mouth facing downward, to hold the mouth at the surface of a mass of articles placed in the reservoir, during the collection of each charge, and to move the charged implement to a discharge location above the receptacle for the discharge to the receptacle of each charge, the receptacle being positioned at a site spaced from the surface of the mass of articles in the receptacle; and
   h. a vibration generator operably associated with the container to agitate and mobilize the articles at the upper surface of a mass held in the interior of the container.

18. Apparatus as in claim 17 and wherein the implement support means further comprises means for providing an intermittent upward elevating force in an amount greater than the gravitational force on the implement and carriage and for applying a residual upward force resisting downward movement, in an amount to partially offset the gravitational force on the implement and carriage at times when the upward elevating force is not applied.

19. Apparatus as in claim 17 and wherein the support means comprises a sleeve slidably engaging the implement for movement of the implement along the path of travel, with the head of the implement extending downward beyond the sleeve when at the reservoir and being within the sleeve when the head of the implement is at the discharge position and wherein the means of presenting the receptacle at said receptacle location comprises a closure capable of closing off the sleeve below the head of the implement when the head is at the discharge position to form the receptacle for receiving the charge and of being movable out of the sleeve opening for clearing the said path during movement of the implement along said path to and from the reservoir.

20. Apparatus as in claim 19 and further comprising means for injecting compressed air into the receptacle, whereby to facilitate the entrainment of the articles of charge deposited into the receptacle in the air flow to the feeder generated by the vacuum generator.

21. Apparatus as in claim 8 and which further comprises means for supporting the implement and adapted to support the implement with the head downward into the container interior with the implement mouth facing downward, to hold the mouth at the surface of a mass of articles placed in the reservoir, during the collection of each charge, and to move the charged implement to a discharge location above the receptacle for the discharge to the receptacle of each charge, the receptacle being positioned at a site spaced from the surface of the mass of articles in the receptacle, and wherein the location selected for the receptacle is a distance upward from the reservoir and the implement support means is adapted to move the head of the implement along a path of travel from the reservoir through the selected position for the receptacle to a delivery location above said selected position suitable for dropping the charge into the receptacle at the said selected position and wherein the apparatus further comprises means for presenting the receptacle at said receptacle location when the implement is at the discharge position for delivery of a charge, and for clearing the receptacle from said path during movement of the implement along said path to and from the reservoir.

22. Apparatus as in claim 8 and which further comprises means for supporting the implement and adapted to support the implement with the head downward into the container interior with the implement mouth facing downward, to hold the mouth at the surface of a mass of articles placed in the reservoir, during the collection of each charge, and to move the charged implement to a discharge location above the receptacle for the discharge to the receptacle of each charge, the receptacle being positioned at a site spaced from the surface of the mass of articles in the receptacle and a pneumatic charge transporter for conveying charges received by the receptacle to a receiver at a selected site at a distance from the implement, the charge transporter being in flow communication with the receptacle and comprising a charge feeder at the selected site, the feeder having a chamber, a conduit connecting the receiver to the feeder chamber at a feeder chamber inlet, the conduit adapted to provide flow communication therebetween for air entrained articles, and a conduit connecting the vacuum generator to the feeder chamber, at a feeder chamber outlet, and adapted to provide flow communication therebetween to cause, upon activation of the vacuum generator, air flow from the receiver to the feeder chamber, whereby to entrain articles of a charge dropped into the receptacle to convey the articles into the feeder chamber, the feeder chamber adapted to decrease the flow velocity of article-entrained air flow between the inlet and outlet to cause the articles to detrain from the air flow and fall to and deposit in the chamber, and having means for withdrawing from the chamber and delivering at the site the deposited charge, and wherein and the chamber has a cross section in the flow direction between the inlet and outlet that is substantially greater than the cross section of the conduit, a baffle positioned to interpose the flow from the inlet to the outlet to deflect the entrained articles away from the outlet, an opening at the bottom of the chamber facing downward, the opening adapted for dispensing articles deposited at the bottom of the chamber and a has closure that closes of the opening and is openable to release articles downwardly to the exterior of the chamber articles deposited at the bottom of the chamber and wherein the feeder chamber inlet and outlet are spaced upwardly from the chamber bottom.

\* \* \* \* \*